United States Patent
Lu et al.

(10) Patent No.: US 12,483,956 B2
(45) Date of Patent: Nov. 25, 2025

(54) GROUP MIGRATION METHOD AND APPARATUS AND SYSTEM

(71) Applicant: FUJITSU LIMITED, Kawasaki (JP)

(72) Inventors: Yang Lu, Beijing (CN); Guorong Li, Beijing (CN); Meiyi Jia, Beijing (CN)

(73) Assignee: FUTJITSU LIMITED, Kawasaki (JP)

( * ) Notice: Subject to any disclaimer, the term of this patent is extended or adjusted under 35 U.S.C. 154(b) by 344 days.

(21) Appl. No.: 18/133,746

(22) Filed: Apr. 12, 2023

(65) Prior Publication Data
US 2023/0308975 A1  Sep. 28, 2023

Related U.S. Application Data

(63) Continuation of application No. PCT/CN2020/123024, filed on Oct. 22, 2020.

(51) Int. Cl.
*H04W 36/08* (2009.01)
*H04W 36/00* (2009.01)

(52) U.S. Cl.
CPC ..... *H04W 36/087* (2023.05); *H04W 36/0009* (2018.08); *H04W 36/0058* (2018.08)

(58) Field of Classification Search
CPC ........... H04W 36/087; H04W 36/0009; H04W 36/0058
See application file for complete search history.

(56) References Cited

U.S. PATENT DOCUMENTS

| | | | |
|---|---|---|---|
| 2021/0250817 A1 | 8/2021 | Zou et al. | |
| 2021/0315043 A1 | 10/2021 | Luo et al. | |
| 2021/0345206 A1* | 11/2021 | Akl | H04W 48/16 |
| 2021/0360439 A1* | 11/2021 | Akl | H04W 76/10 |

(Continued)

FOREIGN PATENT DOCUMENTS

| | | |
|---|---|---|
| CN | 110636570 A | 12/2019 |
| CN | 110830979 A | 2/2020 |

(Continued)

OTHER PUBLICATIONS

The Extended European search report with the Supplementary European search report and the European search opinion, issued by the European Patent Office for corresponding European Patent Application No. 20958272.5-1215, mailed on Nov. 6, 2023.

(Continued)

*Primary Examiner* — Redentor Pasia
(74) *Attorney, Agent, or Firm* — Myers Wolin, LLC

(57) ABSTRACT

A group migration apparatus, configured in a source donor device, includes a first receiver configured to receive a measurement report transmitted by a migrating IAB (integrated access and backhaul) node, a first transmitter configured to transmit a first migration request message to a target donor device, the first migration request message including context information on the migrating IAB node and its served child IAB-node or UE (user equipment), a second receiver configured to receive a first response message transmitted by the target donor device, the first response message including an RRC (radio resource control) reconfiguration message for the migrating IAB node and its served child IAB-node or UE, and a second transmitter configured to transmit the RRC reconfiguration message to the migrating IAB node and its served child IAB-node or UE.

14 Claims, 15 Drawing Sheets

(56) References Cited

U.S. PATENT DOCUMENTS

| | | | |
|---|---|---|---|
| 2022/0014990 A1* | 1/2022 | Akl | H04W 36/0061 |
| 2022/0322464 A1 | 10/2022 | Luo et al. | |
| 2022/0369177 A1* | 11/2022 | Cao | H04W 36/0064 |
| 2022/0369190 A1* | 11/2022 | Diao | H04W 76/20 |
| 2023/0156565 A1* | 5/2023 | Huang | H04W 40/36 |
| 2023/0199580 A1* | 6/2023 | Wang | H04W 36/0069 370/331 |
| 2023/0247495 A1* | 8/2023 | Teyeb | H04W 40/24 370/331 |
| 2023/0362745 A1* | 11/2023 | Huang | H04W 40/36 |
| 2023/0397084 A1* | 12/2023 | Shah | H04W 40/12 |

FOREIGN PATENT DOCUMENTS

| | | | |
|---|---|---|---|
| CN | 111093286 A | 5/2020 | |
| WO | WO-2019246446 A1 * | 12/2019 | H04W 36/0055 |

OTHER PUBLICATIONS

CATT, "Inter IAB donor-CU topology adaptation", Agenda Item: 13.2.1, 3GPP TSG-RAN3 Meeting #109-e, R3-204732, E-meeting, Aug. 17-28, 2020.

CATT, "Group Handover in Inter IAB donor-CU", Agenda Item: 13.2.1, 3GPP TSG-RAN3 Meeting #109-e, R3-204733, E-meeting, Aug. 17-28, 2020.

First Notification of Office Action and Search Report issued by the China National Intellectual Property Administration for corresponding Chinese Patent Application No. 202080105466.1, mailed on Oct. 22, 2024, with an English translation.

International Search Report and Written Opinion of the International Searching Authority issued by the China National Intellectual Property Administration for corresponding International Patent Application No. PCT/CN2020/123024, mailed on Jul. 22, 2021, with an English translation.

Qualcomm Incorporated, "Remaining IP transport issues for IAB", Agenda Item: 13.2.1.3, 3GPP TSG-RAN WG3 Meeting #107-e, R3-200417, Electronic Meeting, Feb. 24-Mar. 6, 2020.

* cited by examiner

GROUP MIGRATION METHOD AND APPARATUS AND SYSTEM

CROSS-REFERENCE TO RELATED APPLICATION

This application is a continuation application of International Application PCT/CN2020/123024 filed on Oct. 22, 2020 and designated the U.S., the entire contents of which are incorporated herein by reference.

FIELD

This disclosure relates to the field of communications.

BACKGROUND

Seamless cellular network deployment in the future needs very flexible and ultra-dense NR cell deployment. The ultra-dense network is one of goals of 5 G, and deployment of an NR network with no wired backhaul is very important for the realization of 5G ultra-dense network. As coverage of a cell is reduced due to a 5G millimeter wave, a wireless self-backhauling system needs further to be of multi-hop to meet deployment requirements. High bandwidth, large-scale MIMO and beam system of 5G make it easier for 5G to develop the wireless self-backhauling system of ultra-dense NR cells than LTE. In order to develop this multi-hop system with wireless self-backhauling, 3GPP began research and standardization of an IAB (integrated access and backhaul) project in R16.

FIG. 1 is a schematic diagram of an IAB system. As shown in FIG. 1, in the IAB system, a relay node supports both access and backhaul functions. A wireless transmission link of the relay node multiplexes an access link and a backhaul link in the time domain, frequency domain or spatial domain. The access link and the backhaul link may use identical or different frequency bands.

In an IAB network architecture, the relay node refers to an IAB-node, which supports both access and backhaul functions. A last hop of access node at the network side is referred to as an IAB-donor, which supports a gNB function and supports IAB-node access. All UE data may be transferred to the IAB-donor via one or more hops via the IAB-node. Functions of the IAB-node are divided into two parts, one is a gNB-DU function, referred to as an IAB-DU, and the other is a UE function, referred to as an IAB-MT. The IAB-DU realizes function of a network side device, which is connected to a downstream child IAB-node, provides NR air access to the UE and the downstream child IAB-node, and establishes F1 connection with the IAB donor-CU. The IAB-MT realizes functions of part of a terminal equipment and is connected to an upstream parent IAB-node or IAB-donor DU. The IAB-MT includes functions of physical layer, layer 2, RRC and NAS layer, and is further indirectly connected to the IAB donor-CU and a core network. The IAB-node may access to the network in an SA mode or EN-DC mode. FIG. 2 is a schematic diagram of an IAB architecture of the SA mode. FIG. 3 is a schematic diagram of an IAB architecture of the EN-DC mode. FIG. 4 is a schematic diagram of the parent IAB-node and the child IAB-node.

FIG. 5 is a schematic diagram of a protocol stack of an F1-user plane between the IAB-DU and IAB-donor CU. FIG. 6 is a schematic diagram of a protocol stack of an F1-control plane between the IAB-DU and IAB-donor CU.

As shown in FIG. 5 and FIG. 6, the F1-user plane (F1-U) and F1-control plane (F1-C) are built on a transmission (IP) layer between the IAB-DU and IAB-donor-CU. Two hops of wireless backhaul and one hop of wired backhaul are performed in FIG. 5 and FIG. 6. On the backhaul link, the transmission (IP) layer is carried on a backhaul adaptive protocol (BAP) sublayer. A BAP entity in the IAB-node executes a routing function of the IAB system, and the IAB-donor CU provides a routing table. BAP PDUs are transmitted in an RLC channel of the backhaul link, multiple RLC channels of the backhaul link may be configured by the IAB-donor to carry services of different priorities and QoS, and the BAP entity maps the BAP PDUs to different backhaul RLC channels.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that an R16 IAB system has supported adaptive changes in topology and routing caused by migration of the IAB-node between different DUs under the same donor. When the IAB-node migrates under the same donor, there is no need to establish new F1-control plane connection with the donor, which has no impact on the downstream child IAB-node and UE, and the child IAB-node and UE may maintain the connection with the IAB-node. An R17 IAB system will introduce a mobility function of an IAB-node under different donors. However, in this case, as the IAB-node migrates to a new donor, it will have a great impact on the downstream child IAB-node and UE, and the child IAB-node and UE will experience a wireless link failure with the IAB-node.

For example, an existing method of migration of the IAB-node between donors is that when the IAB-node migrates to a new donor, the downstream child IAB-node and UE experience wireless link failure with the IAB-node, and then the downstream child IAB-node and UE initiate an RRC reestablishment process to reconnect to the IAB-node and establish RRC connection with the new donor. In this way, it will cause a relatively long time of service communication interruption. As the downstream child IAB-node will also reestablish to a new donor, the UE served by the child IAB-node will also experience wireless link failure, hence, the UE served by the child IAB-node will have a longer time of communication interruption.

In order to solve at least one of the above problems or other similar problems, embodiments of this disclosure provide a group migration method and apparatus and a system.

According to an aspect of the embodiments of this disclosure, there is provided a group migration apparatus, configured in a source donor device, the apparatus including:

a first receiving unit configured to receive a measurement report transmitted by a migrating IAB node;

a first transmitting unit configured to transmit a first migration request message to a target donor device, the first migration request message including context information on the migrating IAB node and its served child IAB-node or UE;

a second receiving unit configured to receive a first response message transmitted by the target donor device, the first response message including an RRC reconfiguration message for the migrating IAB node and its served child IAB-node or UE; and a second transmitting unit configured to transmit the RRC reconfiguration message to the migrating IAB node and its served child IAB-node or UE.

According to an aspect of the embodiments of this disclosure, there is provided a group migration apparatus, configured in a source donor device, the apparatus including:

a first receiving unit configured to receive a measurement report transmitted by a migrating IAB node;

a first transmitting unit configured to transmit a first migration request message to a target donor device, the first migration request message including context information on the migrating IAB node and its served child IAB-node or UE;

a second receiving unit configured to receive a first response message transmitted by the target donor device, the first response message including an RRC reconfiguration message for the migrating IAB node; and a second transmitting unit configured to transmit the RRC reconfiguration message to the migrating IAB node.

According to an aspect of the embodiments of this disclosure, there is provided a group migration apparatus, configured in a target donor device, the apparatus including:

a first receiving unit configured to receive a first migration request message transmitted by a source donor device, the first migration request message including context information on a migrating IAB node and its served child IAB-node or UE;

a first transmitting unit configured to transmit a first response message to the source donor device, the first response message including an RRC reconfiguration message for the migrating IAB node and its served child IAB-node or UE;

a first processing unit configured to establish new F1 connection with the migrating IAB node; and a second receiving unit configured to receive an RRC reconfiguration complete message transmitted by the migrating IAB node and its served child IAB-node or UE.

According to an aspect of the embodiments of this disclosure, there is provided a group migration apparatus, configured in a target donor device, the apparatus including:

a first receiving unit configured to receive a first migration request message transmitted by a source donor device, the first migration request message including context information on a migrating IAB node and its served child IAB-node or UE;

a first transmitting unit configured to transmit a first response message to the source donor device, the first response message including an RRC reconfiguration message for the migrating IAB node;

a first processing unit configured to establish new F1 connection with the migrating IAB node;

a second transmitting unit configured to transmit the RRC reconfiguration message to the child IAB-node or UE served by the migrating IAB node via the new F1 connection; and a second receiving unit configured to receive an RRC reconfiguration complete message transmitted by the migrating IAB node and its served child IAB-node or UE.

According to an aspect of the embodiments of this disclosure, there is provided a group migration apparatus, configured in a migrating IAB node, the apparatus including:

a first transmitting unit configured to transmit a measurement report to a source donor device;

a first receiving unit configured to receive an RRC reconfiguration message transmitted by the source donor device;

a processing unit configured to establish new F1 connection with a target donor device;

a second receiving unit configured to receive an RRC reconfiguration message for a child IAB-node or UE served by the migrating IAB node transmitted by the source donor device via old F1 connection;

a second transmitting unit configured to transmit the RRC reconfiguration message to the child IAB-node or UE;

a third transmitting unit configured to transmit an RRC reconfiguration complete message to the target donor device; and a fourth transmitting unit configured to transfer to the target donor device an RRC reconfiguration complete message transmitted by the child IAB-node or UE.

According to an aspect of the embodiments of this disclosure, there is provided a group migration apparatus, configured in a migrating IAB node, the apparatus including:

a first transmitting unit configured to transmit a measurement report to a source donor device;

a first receiving unit configured to receive an RRC reconfiguration message transmitted by the source donor device;

a processing unit configured to establish new F1 connection with a target donor device;

a second receiving unit configured to receive an RRC reconfiguration message for a child IAB-node or UE served by the migrating IAB node transmitted by the source donor device via the new F1 connection;

a second transmitting unit configured to transmit the RRC reconfiguration message to the child IAB-node or UE;

a third transmitting unit configured to transmit an RRC reconfiguration complete message to the target donor device; and a fourth transmitting unit configured to transfer to the target donor device an RRC reconfiguration complete message transmitted by the child IAB-node or UE.

According to an aspect of the embodiments of this disclosure, there is provided a group migration apparatus, configured in a child IAB-node served by a migrating IAB node, the apparatus including:

a first receiving unit configured to receive an RRC reconfiguration message transmitted by a source donor device;

a processing unit configured to establish new F1 connection with a target donor device; and a first transmitting unit configured to transmit an RRC reconfiguration complete message to the target donor device.

According to an aspect of the embodiments of this disclosure, there is provided a group migration apparatus, configured in a terminal equipment served by a migrating IAB node, the apparatus including:

a receiving unit configured to receive an RRC reconfiguration message transmitted by a source donor device or a target donor device; and a transmitting unit configured to transmit an RRC reconfiguration complete message to the target donor device.

One of the advantages of the embodiments of this disclosure exists in that according to the embodiments of this disclosure, when a IAB-node migrates to a target donor, there is no need to reestablish new RRC connection with a CU of the target donor in an RRC reestablishment mode, which may reduce service communication interruption time during migration of the IAB-node.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
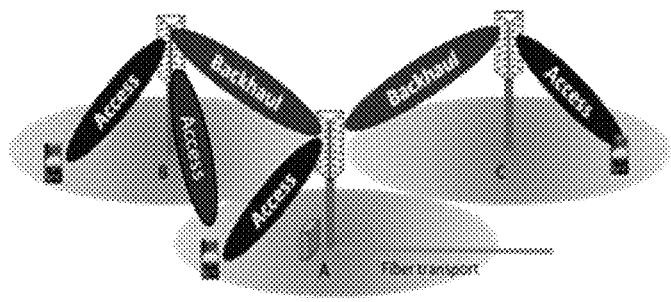
FIG. 1 is schematic diagram of an IAB system.
Figure 2:
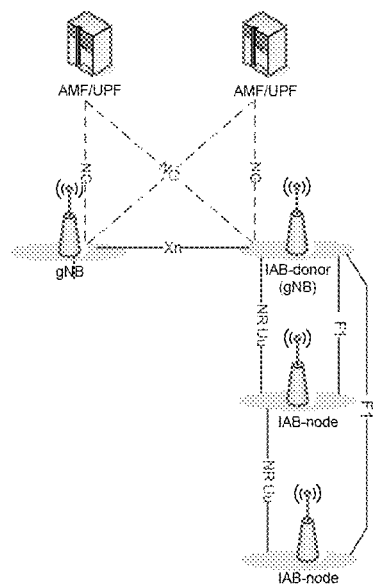
FIG. 2 is a schematic diagram of an IAB architecture in an SA mode.
Figure 3:
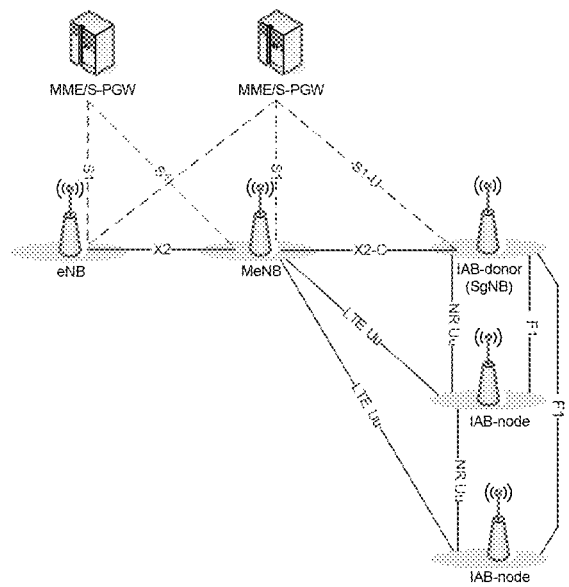
FIG. 3 is a schematic diagram of an IAB architecture in an EN-DC mode.
Figure 4:
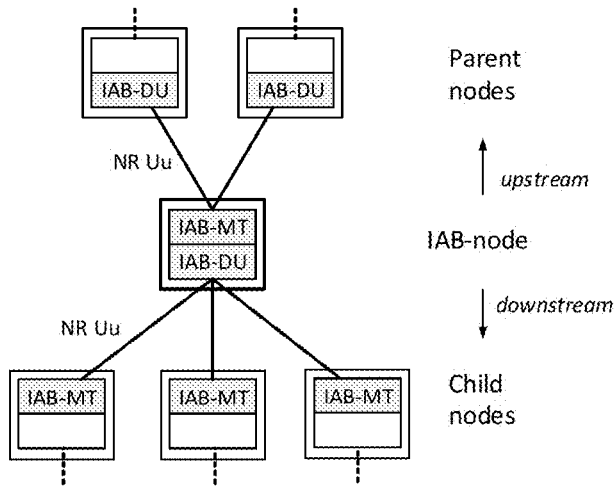
FIG. 4 is a schematic diagram of a parent IAB-node and a child IAB-node.
Figure 5:
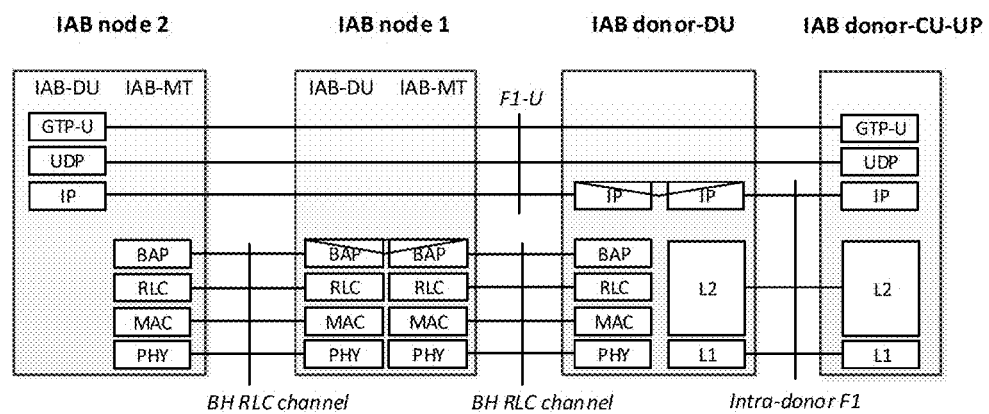
FIG. 5 is a schematic diagram of a protocol stack of an F1-user plane between an IAB-DU and an IAB-donor CU.
Figure 6:
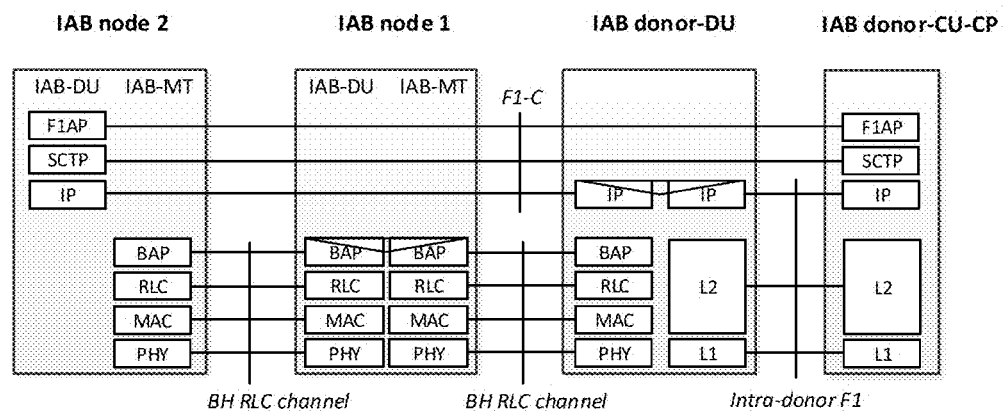
FIG. 6 is a schematic diagram of a protocol stack of an F1-control plane between an IAB-DU and an IAB-donor CU.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and 6G in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

An embodiment of this disclosure proposes a group migration method. This method is applicable to an IAB system and provides a method for adaptive changes in routing and topology caused by migration of an IAB-node between different donor devices. In the embodiment of this disclosure, when the IAB-node migrates to a target donor device, all child IAB-nodes and UEs of the IAB-node migrate under control of a network side. Preparation for migration of the IAB-node, a UE and child IAB-node served by the IAB-node and a UE served by the child IAB-node is performed between the source donor device and the target donor device, a CU of the source donor device transmits reconfiguration message to the IAB-node, the UE and child IAB-node served by the IAB-node and the UE served by the child IAB-node, and these child IAB-nodes and UEs transfer reconfiguration complete messages to a CU of the target donor device via the IAB-node to complete connection to the target donor device, with no need of reestablishing RRC connection with the CU of the target donor device in an RRC reestablishment mode. This may reduce the interruption time of service communication during migration of the IAB-node.

Figure 7:
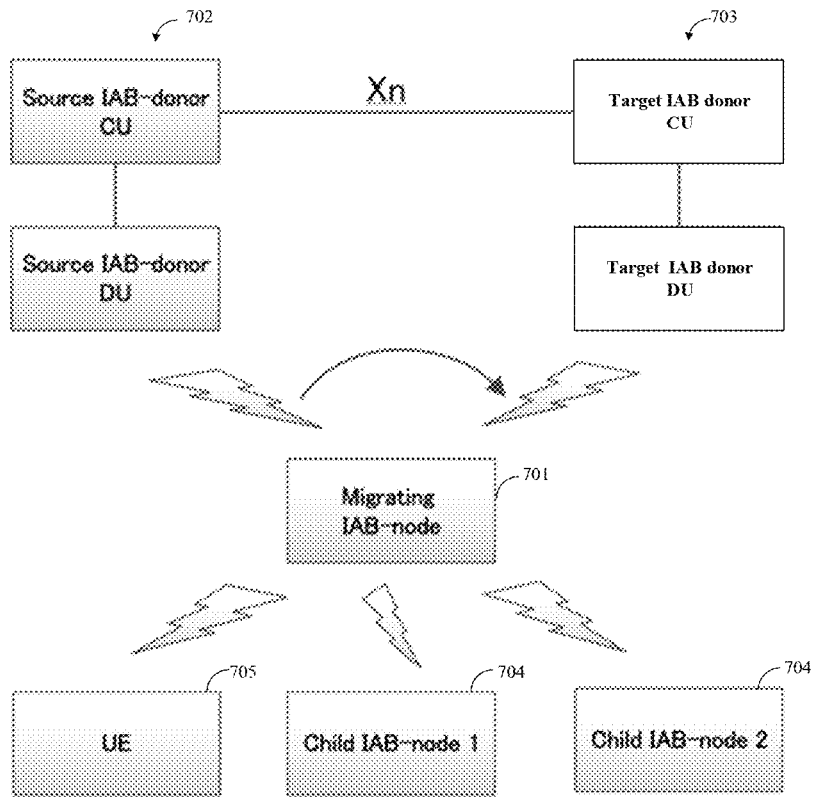
FIG. 7 is a schematic diagram of an implementation scenario of an embodiment of this disclosure.

FIG. 7 is a schematic diagram of an implementation scenario of the embodiment of this disclosure. As shown in FIG. 7, a migrating IAB node 701 may migrate between multiple donor devices 702 and 703, and a child IAB-node 704 and UE 705 served by the migrating IAB node 701 migrate under the control of the network side. For the convenience of illustration, FIG. 7 shows only one migrating IAB node 701, one source donor device 702, one target donor device 703, and one UE 705 and two child IAB-nodes 704 served by the migrating IAB node 701; however, this disclosure is not limited thereto.

In the embodiment of this disclosure, the IAB-node is divided into an IAB-DU part and an IAB-MT part. The IAB-DU realizes functions of a DU device at the network side, provides NR air access to UE and MT and establishes F1 connection with IAB donor-CU, and the IAB-MT realizes function of a terminal equipment.

A process of migration of IAB-node between different donor nodes may be divided into three independent processes:

1. migration of the IAB-MT part of the IAB-node;
2. migration of the IAB-DU part of the IAB-node; and
3. migration of a UE served by the IAB-node.

The migration of the IAB-MT part refers to that a PCell serving for the IAB-node migrates from the source donor device to the target donor device, and the IAB-node disconnects the RRC connection with the source donor device and establishes the RRC connection with the target donor device. And the migration of the IAB-DU part refers to that the F1 connection between the IAB-node and the CU migrates from the source donor device to the target donor device, and the IAB-node provides NR air interface access as a new serving cell.

In the embodiment of this disclosure, the following two implementation scenarios are mainly taken into account:

scenario 1: the IAB-MT of the migrating IAB-node, the IAB-MT of the child IAB-node and the UE served by the migrating IAB-node migrate at the same time;

in this scenario, the source donor device transmits RRC reconfiguration messages to the migrating IAB-node, the child IAB-node and the UE at the same time;

scenario 2: the IAB-MT of the child IAB-node and the UE served by the migrating IAB-node migrate after the migration of the IAB-DU or IAB-MT of the migrating IAB-node;

in this scenario, after the target donor device establishes F1 connection with the migrating IAB-node, or after the target donor receives the RRC reconfiguration complete message transmitted by the migrating IAB-node, the source donor device or the target donor device transmits the RRC reconfiguration message to the child IAB-node and the UE.

Embodiments of this disclosure shall be described below with reference to the accompanying drawings. These embodiments are illustrative only, and are not intended to limit this disclosure.

Embodiment of a First Aspect

The embodiment of this disclosure provides a group migration method.

Figure 8:
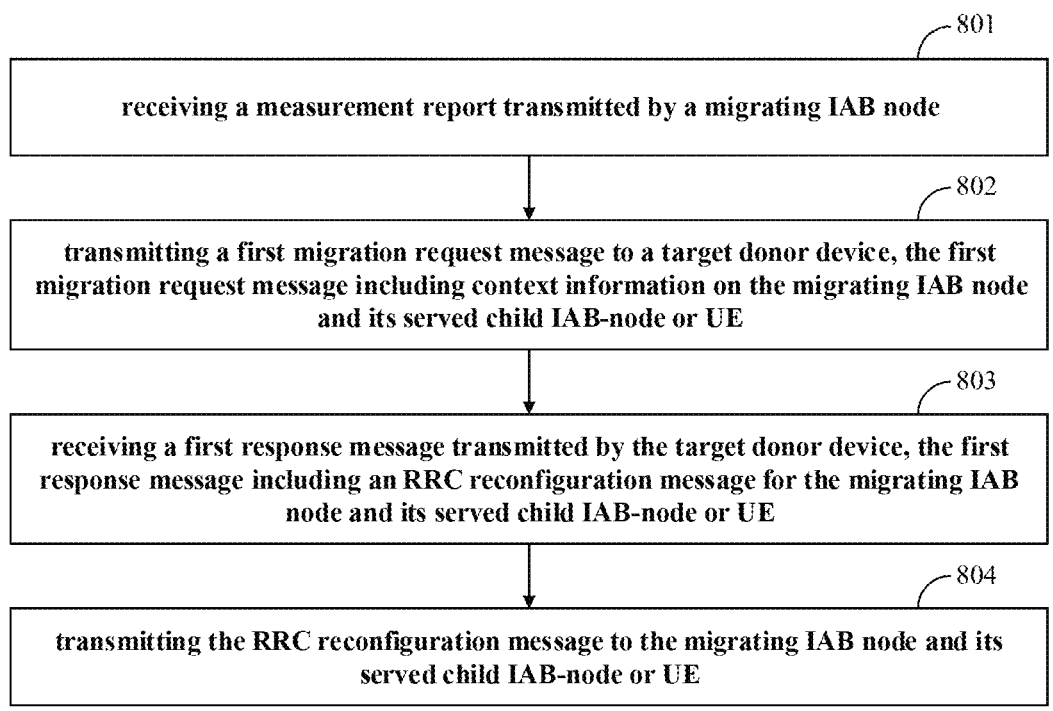
FIG. 8 is a schematic diagram of the group migration method of an embodiment of a first aspect of this disclosure.

FIG. 8 is a schematic diagram of the group migration method of the embodiment of this disclosure, which shall be described from a side of a source donor device in an IAB network. As shown in FIG. 8, the method includes:

801: receiving a measurement report transmitted by a migrating IAB node;

802: transmitting a first migration request message to a target donor device, the first migration request message including context information on the migrating IAB node and its served child IAB-node or UE;

803: receiving a first response message transmitted by the target donor device, the first response message including an RRC reconfiguration message for the migrating IAB node and its served child IAB-node or UE; and

804: transmitting the RRC reconfiguration message to the migrating IAB node and its served child IAB-node or UE.

Figure 9:
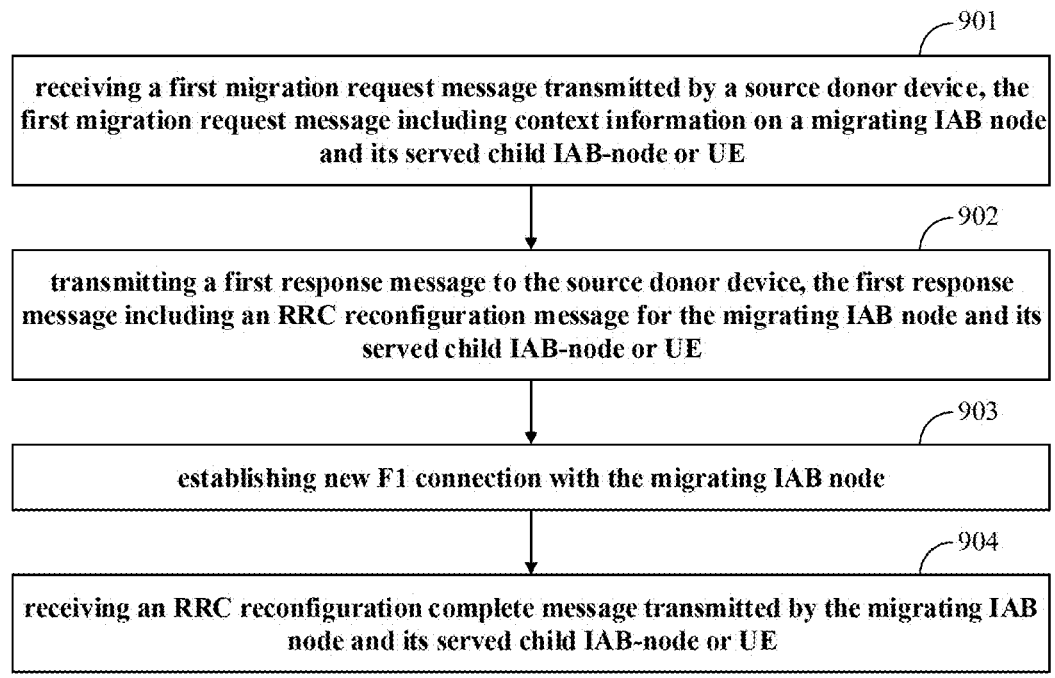
FIG. 9 is another schematic diagram of the group migration method of the embodiment of the first aspect of this disclosure.

FIG. 9 is another schematic diagram of the group migration method of the embodiment of this disclosure. The method shall be described from a side of a target device in the IAB network, and corresponds to the method in FIG. 8. As shown in FIG. 9, the method includes:

901: receiving a first migration request message transmitted by a source donor device, the first migration request message including context information on a migrating IAB node and its served child IAB-node or UE;

902: transmitting a first response message to the source donor device, the first response message including an RRC reconfiguration message for the migrating IAB node and its served child IAB-node or UE;

903: establishing new F1 connection with the migrating IAB node; and

904: receiving an RRC reconfiguration complete message transmitted by the migrating IAB node and its served child IAB-node or UE.

Figure 10:
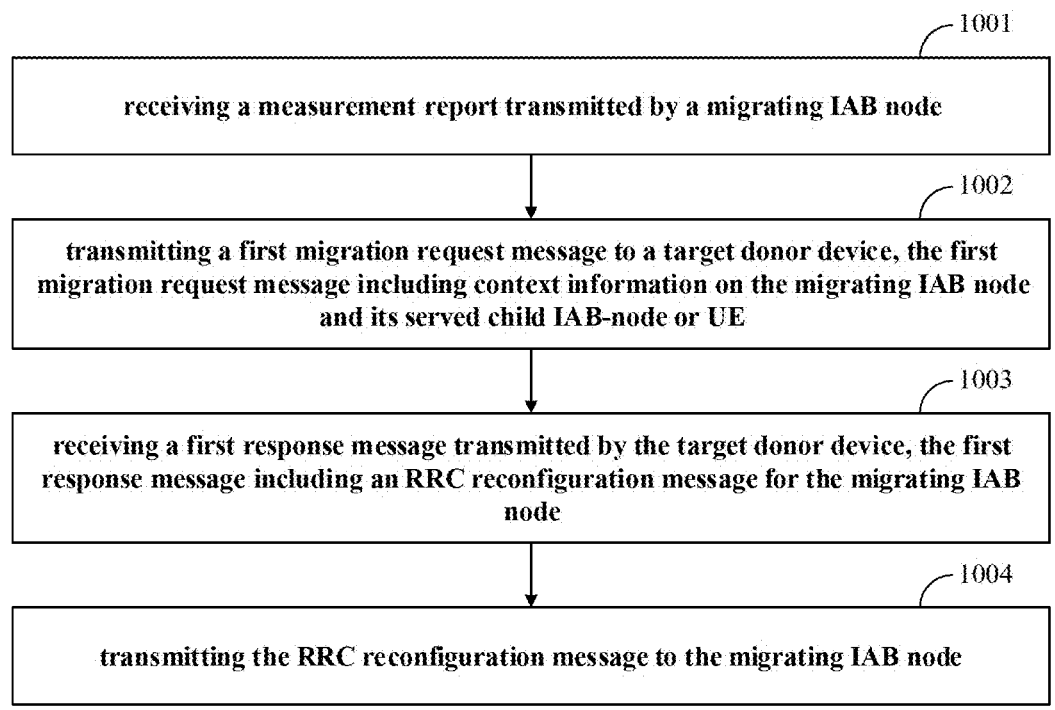
FIG. 10 is a further schematic diagram of the group migration method of the embodiment of the first aspect of this disclosure.

FIG. 10 is a further schematic diagram of the group migration method of the embodiment of this disclosure, which shall be described from a side of a source donor device in an IAB network. As shown in FIG. 10, the method includes:

1001: receiving a measurement report transmitted by a migrating IAB node;

1002: transmitting a first migration request message to a target donor device, the first migration request message including context information on the migrating IAB node and its served child IAB-node or UE;

1003: receiving a first response message transmitted by the target donor device, the first response message including an RRC reconfiguration message for the migrating IAB node; and

1004: transmitting the RRC reconfiguration message to the migrating IAB node.

Figure 11:
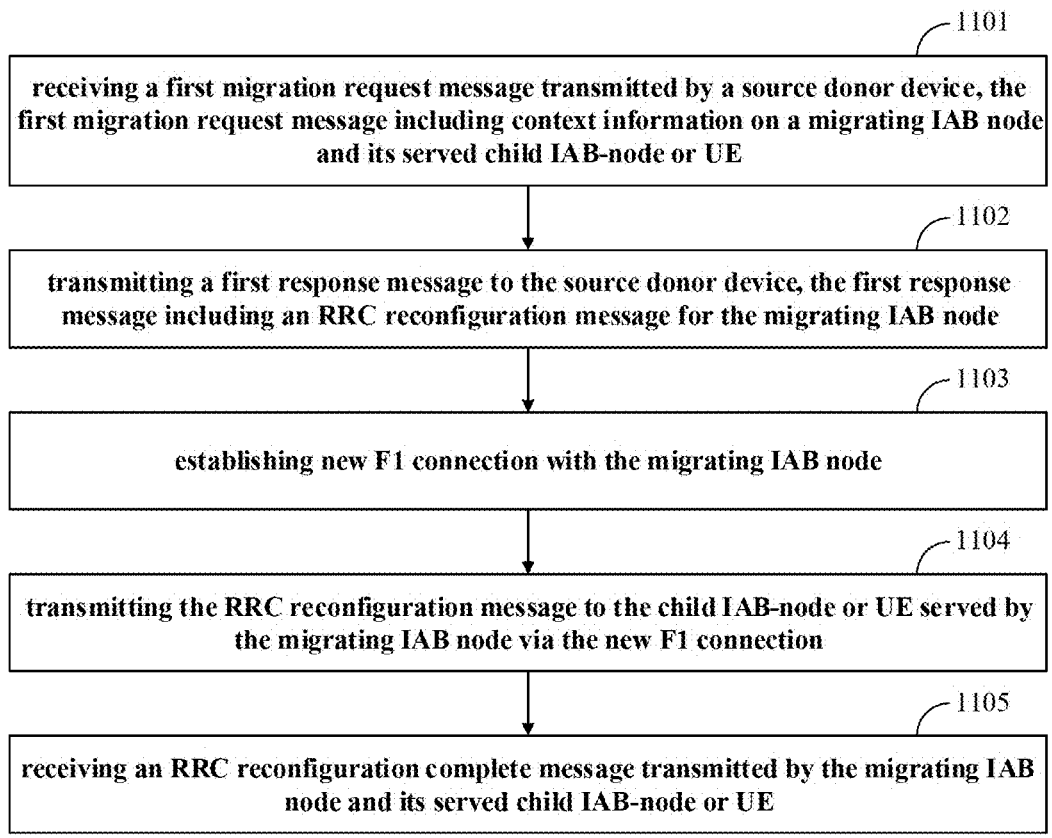
FIG. 11 is still another schematic diagram of the group migration method of the embodiment of the first aspect of this disclosure.

FIG. 11 is still another schematic diagram of the group migration method of the embodiment of this disclosure, which shall be described from a side of a target device side in the IAB network, and corresponds to the method in FIG. 10. As shown in FIG. 11, the method includes:

1101: receiving a first migration request message transmitted by a source donor device, the first migration request message including context information on a migrating IAB node and its served child IAB-node or UE;

1102: transmitting a first response message to the source donor device, the first response message including an RRC reconfiguration message for the migrating IAB node;

1103: establishing new F1 connection with the migrating IAB node;

1104: transmitting the RRC reconfiguration message to the child IAB-node or UE served by the migrating IAB node via the new F1 connection; and

1105: receiving an RRC reconfiguration complete message transmitted by the migrating IAB node and its served child IAB-node or UE.

The methods in FIG. 8 and FIG. 9 correspond to the above scenario 1, and the methods in FIG. 10 and FIG. 11 correspond to the above scenario 2. According to the methods in the embodiment of this disclosure, when an IAB node migrates between different donor devices, there is no need to reestablish RRC connection with the target donor device in a manner of RRC reestablishment, which may reduce a service communication interruption time during the migration of the IAB node.

In the embodiments of this disclosure, in some embodiments, the context information on the migrating IAB node includes: an IAB-DU context and an IAB-MT context of the migrating IAB node, and the context information on the child IAB-node includes an IAB-DU context and an IAB-MT context of the child IAB-node.

In some embodiments, the IAB-DU context of the migrating IAB node includes: serving cell information of the IAB-DU of the migrating IAB node under the source donor device. Here, the serving cell information includes at least one of the following: a new radio cell global identifier (NR CGI); a new radio physical cell identifier (NR PCI); a public land mobile network (PLMN) served by the IAB-DU; and an uplink and downlink transmission frequency point and bandwidth; however, this application is not limited thereto.

In some embodiments, the IAB-MT context of the migrating IAB node includes BAP configuration information. The BAP configuration information includes a BAP address, a transport layer (IP) address, a default uplink backhaul RLC channel identifier and/or a default uplink BAP routing identifier, allocated by the source donor device for the IAB node. The default uplink BAP routing identifier refers to a default destination BAP address and a default path identifier.

In the embodiments of this disclosure, in some embodiments, the above first migration request message further includes backhaul information configured by the source donor device for the migrating IAB node or the child IAB-node.

In some embodiments, the backhaul information includes at least one of the following:
- a correspondence between a previous hop BAP address with ingress backhaul RLC channel identifier and a next hop BAP address with egress backhaul RLC channel identifier; and
- a correspondence between a BAP routing identifier configured by the source donor device for the migrating IAB node or the child IAB-node and a next hop BAP address.

Figure 12:
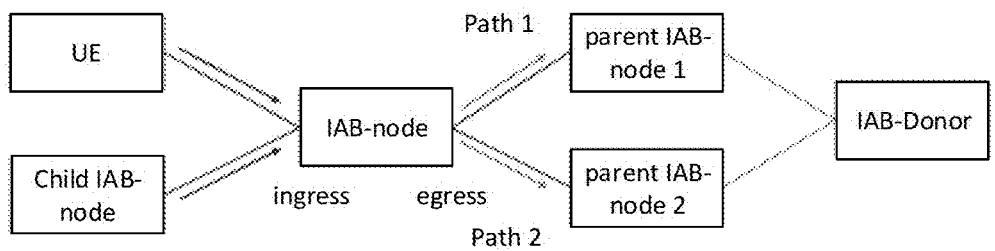
FIG. 12 is a schematic diagram of an ingress and egress of the IAB node.

FIG. 12 shows a relationship between an ingress and egress of the IAB node.

In some embodiments, the backhaul information includes at least one of the following:
- a BAP routing identifier used by a DRB of a UE served by the migrating IAB node or the child IAB-node, a next hop BAP address and a backhaul RLC channel identifier, and
- a BAP routing identifier used by F1-control plane data or non-F1 data, a next hop BAP address and a backhaul RLC channel identifier.

In the above embodiment, the BAP routing identifier includes a destination BAP address and a path identifier. An example of the BAP routing identifier is given below:

```
BAP-Routing-ID-r16::=   SEQUENCE{
    bap-Address-r16         BIT STRING (SIZE (10)),
    bap-PathId-r16          BIT STRING (SIZE (10))
}
```

In the embodiments of this disclosure, in some embodiments, the above first migration request message further includes topology information, the topology information including a topology relationship between the migrating IAB node and its served child IAB-node or UE, or including a topology relationship between the child IAB-node and its served grandchild IAB-node or UE.

In the embodiments of this disclosure, in some embodiments, the above first migration request message further includes address request information, which is used to request the target donor device to allocate a new transport layer (IP) address or a BAP address for the migrating IAB node or child IAB-node.

In the embodiment of this disclosure, in 903 and 1103 described above, the target donor device establishes new F1 connection with the migrating IAB node, which may be that: the target donor device receives an F1 establishment request message transmitted by the migrating IAB node; and transmits an F1 establishment response message to the migrating IAB node. Thus, the target donor device establishes the new F1 connection with the migrating IAB node.

In the embodiments of this disclosure, in some embodiments, the target node may further establish new F1 connection with the child IAB-node, a mode of establishment being identical to that described above, which is not limited in this disclosure.

In the embodiment of this disclosure, after the target donor device receives the RRC reconfiguration complete message transmitted by the migrating IAB node, the target donor device may further configure RLC channel mapping and a BAP routing configuration for the migrating IAB node. In some embodiments, the BAP routing configuration includes the routing identifier and a correspondence between the routing identifier and a next hop BAP address.

In the embodiment of this disclosure, after the target donor device receives the RRC reconfiguration complete message transmitted by the migrating IAB node or establishes new F1 connection with the migrating IAB node, the target donor device may further transmit a first indication message to the source donor device, and indicate the source donor device via the first indication message to transmit the RRC reconfiguration message to the child IAB-node or UE.

In the embodiment of this disclosure, the context information on the migrating IAB node and the context information on the child IAB-node or UE are included in same Xn messages or different Xn messages.

In some embodiments, the source donor device first transmits an Xn message containing the context information on the migrating IAB node to the target donor, so that the target donor first transmits the RRC reconfiguration message for the migrating IAB node. After the target donor device receives the RRC reconfiguration complete message transmitted by the migrating IAB node, or establishes new F1 connection with the migrating IAB node, the target donor device may further transmit a second indication message to the source donor device, and indicate the source donor device via the second indication message to transmit an Xn message containing the context on the child IAB-node or UE to the target donor device, so that the target donor transmits the RRC reconfiguration message for the child IAB-node or UE.

In the embodiment of this disclosure, the RRC reconfiguration message for the migrating IAB node and the RRC reconfiguration message for the child IAB-node or UE are contained in same Xn messages or different Xn messages.

In some embodiments, the target donor first transmits the RRC reconfiguration message for the migrating IAB node. After the target donor device receives the RRC reconfiguration complete message transmitted by the migrating IAB node, or establishes new F1 connection with the migrating IAB node, the target donor device transmits the Xn message containing the RRC reconfiguration message for the child IAB-node or UE to the source donor device.

In the embodiments of this disclosure, in some embodiments, after the target donor device receives the RRC reconfiguration complete message transmitted by the migrating IAB node and the RRC reconfiguration complete message transmitted by the child IAB-node, the target donor device may further configure BAP routing for the child IAB-node, and as the child IAB-node may possibly not change the backhaul RLC channel mapping after migrating to the target donor, the target donor device may only configure a BAP routing configuration for the child IAB-node. In the embodiment of this disclosure, the RRC reconfiguration message for the migrating IAB node includes at least one of the following: a default uplink backhaul RLC channel identifier (used for an F1-control plane data or non-F1 data) used in migrating to the target donor device; a default BAP routing identifier (used for F1-control plane data or non-F1 data) used in migrating to the target donor device; a BAP address used in migrating to the target donor device; a transport layer address used in migrating to the target donor device; and a security key configuration used in migrating to the target donor device.

In some embodiments, the RRC reconfiguration message for the migrating IAB node further includes backhaul RLC channel mapping and a BAP routing configuration used in migrating to the target donor device.

In the embodiment of this disclosure, the RRC reconfiguration message for the child IAB-node includes at least one of the following: a default BAP routing identifier (used for F1-control plane data or non-F1 data) used in migrating to the target donor device; a BAP address used in migrating to the target donor device; a transport layer address used in migrating to the target donor device; a security key configuration used in migrating to the target donor device.

In the above embodiment, as the child IAB-node is still connected to the migrating IAB-node DU after migration, the default uplink backhaul RLC channel identifier for the F1-control plane data or non-F1 data may possibly not be changed, and the RRC reconfiguration message does not necessarily contain a new default uplink default RLC channel.

In some embodiments, the RRC reconfiguration message for the child IAB-node further includes: a BAP routing configuration used in migrating to the target donor device.

In the above embodiment, the backhaul RLC channel mapping includes at least one of the following:
  a correspondence between a previous hop BAP address with ingress backhaul RLC channel identifier and a next hop BAP address with egress backhaul RLC channel identifier; and
  a backhaul RLC channel identifier used by the DRB of the UE served by the migrating IAB node.

In the above embodiment, the BAP routing configuration includes at least one of the following:
  a correspondence between the BAP routing identifier and the next hop BAP address; and
  the BAP routing identifier used by the DRB of the UE served by the migrating IAB node and the next hop BAP address.

In the above embodiment, the BAP routing identifier includes a destination BAP address and a path identifier.

In the embodiments of this disclosure, in some embodiments, the RRC reconfiguration message for the UE includes a security key configuration used in migrating to the target donor device.

It should be noted that FIGS. 8-11 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 8-11.

According to the method of the embodiment of this disclosure, as described above, an interruption time of service communication during the migration of the IAB node may be reduced.

Embodiment of a Second Aspect

The embodiment of this disclosure provides a group migration method, which shall be described from a side of a migrating IAB node in an IAB network.

Figure 13:
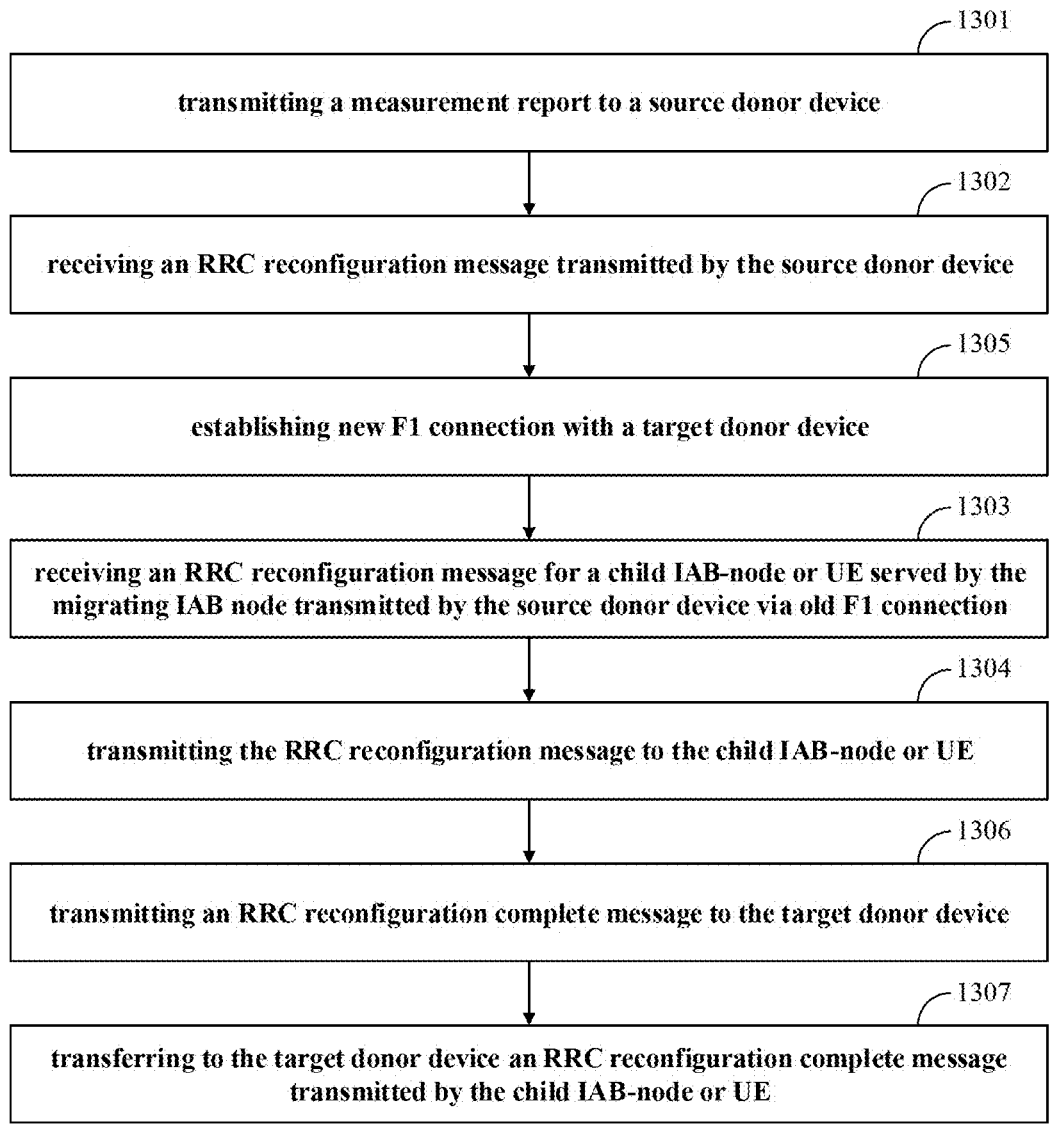
FIG. 13 is a schematic diagram of the group migration method of an embodiment of a second aspect of this disclosure.

FIG. 13 is a schematic diagram of the group migration method of the embodiment of this disclosure. This method is processing at a side of a migrating IAB node corresponding to the method in FIGS. 8 and 9, with contents identical to those in the method in FIGS. 8 and 9 being not going to be repeated herein any further. As shown in FIG. 13, the method includes:
  1301: transmitting a measurement report to a source donor device;
  1302: receiving an RRC reconfiguration message transmitted by the source donor device;
  1303: establishing new F1 connection with a target donor device;
  1304: receiving an RRC reconfiguration message for a child IAB-node or UE served by the migrating IAB node transmitted by the source donor device via old F1 connection;
  1305: transmitting the RRC reconfiguration message to the child IAB-node or UE;
  1306: transmitting an RRC reconfiguration complete message to the target donor device; and
  1307: transferring to the target donor device an RRC reconfiguration complete message transmitted by the child IAB-node or UE.

Figure 14:
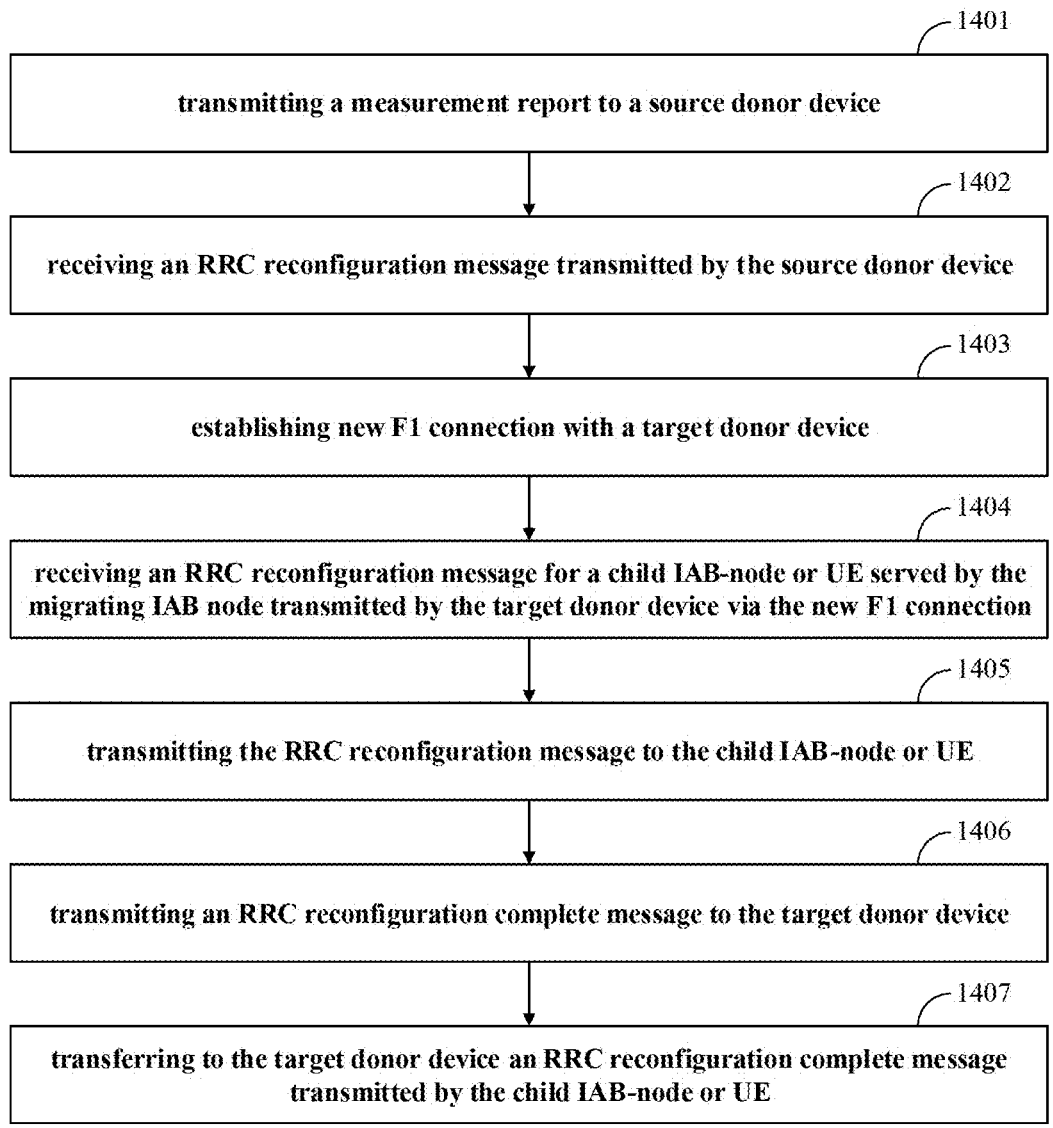
FIG. 14 is another schematic diagram of the group migration method of the embodiment of the second aspect of this disclosure.

FIG. 14 is another schematic diagram of the group migration method of the embodiment of this disclosure. This method is processing at a side of a migrating IAB node corresponding to the method in FIGS. 10 and 11, with contents identical to those in the method in FIGS. 10 and 11 being not going to be repeated herein any further. As shown in FIG. 14, the method includes:
  1401: transmitting a measurement report to a source donor device;
  1402: receiving an RRC reconfiguration message transmitted by the source donor device;
  1403: establishing new F1 connection with a target donor device;
  1404: receiving an RRC reconfiguration message for a child IAB-node or UE served by the migrating IAB node transmitted by the target donor device via the new F1 connection;
  1405: transmitting the RRC reconfiguration message to the child IAB-node or UE;
  1406: transmitting an RRC reconfiguration complete message to the target donor device; and
  1407: transferring to the target donor device an RRC reconfiguration complete message transmitted by the child IAB-node or UE.

According to the method of the embodiment of this disclosure, when an IAB node migrates between different donor devices, there is no need to reestablish the RRC connection with the target donor device in a manner of RRC reestablishment, which may reduce the service communication interruption time during the migration of the IAB node.

In the embodiment of this disclosure, in 1305 and 1403, the establishing new F1 connection with the target donor device may be: transmitting an F1 establishment request message to the target donor to request to establish new F1 connection with the target donor device; and then receiving an F1 establishment response message transmitted by the target donor device, thereby establishing the new F1 connection with the target donor device.

In some embodiments, after 1305 or 1403, that is, after the new F1 connection is established, the migrating IAB node maintains the old F1 connection with the source donor device, and releases the old F1 connection with the source donor device if one of the following conditions is satisfied:
  after transmitting the RRC reconfiguration message to the child IAB-node or UE served by the migrating IAB node;

after receiving the RRC reconfiguration complete message transmitted by the child IAB-node or UE served by the migrating IAB node; and after a predetermined time after the new F1 connection with the target donor device is established.

In some embodiments, after 1305 or 1403, that is, after the new F1 connection is established, the migrating IAB node transmits an F1 release request message to the source donor device to release the old F1 connection with the source donor device.

In some embodiments, after 1305, that is, after the new F1 connection is established, the migrating IAB node transmits the RRC reconfiguration message for the child IAB-node or UE received via the old F1 connection to the child IAB-node or UE, or, after the new F1 connection is established, the migrating IAB node transfers the RRC reconfiguration complete message for the child IAB-node or UE to the target donor device. In this way, it may be ensured that the migrating node successfully transmits the RRC reconfiguration complete message for the child IAB-node or UE to the target donor device via the new F1 connection.

In some embodiments, after 1306 or 1406, that is, after the migrating IAB node transmits the RRC reconfiguration complete message to the target donor device, the migrating IAB node may further receive the backhaul RLC channel mapping and a BAP routing configuration configured by the target donor device.

In the embodiment of this disclosure, the RRC reconfiguration message includes one of the following: a default uplink backhaul RLC channel identifier used in migrating to the target donor device; a default BAP routing identifier used in migrating to the target donor device; a BAP address used in migrating to the target donor device; a transport layer address used in migrating to the target donor device; and a security key configuration used in migrating to the target donor device.

In some embodiments, the RRC reconfiguration message further includes the backhaul RLC channel mapping and a BAP routing configuration used in migrating to the target donor device. Therefore, after 1306 or 1406, that is, after the migrating IAB node transmits the RRC reconfiguration complete message to the target donor device, the migrating IAB node may apply the backhaul RLC channel mapping and BAP routing configuration.

In the above embodiment, reference may be made to the embodiment of the first aspect for interpretation of the backhaul RLC channel mapping and BAP routing configuration, which shall not be repeated herein any further.

It should be noted that FIGS. 13 and 14 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 13 and 14.

According to the method of the embodiment of this disclosure, as described above, an interruption time of service communication during the migration of the IAB node may be reduced.

Embodiment of a Third Aspect

The embodiment of this disclosure provides a group migration method, which shall be described from a side of a child IAB-node served by a migrating IAB node in an IAB network, with contents identical to those in the embodiments of the first and second aspects being not going to be repeated herein any further.

Figure 15:
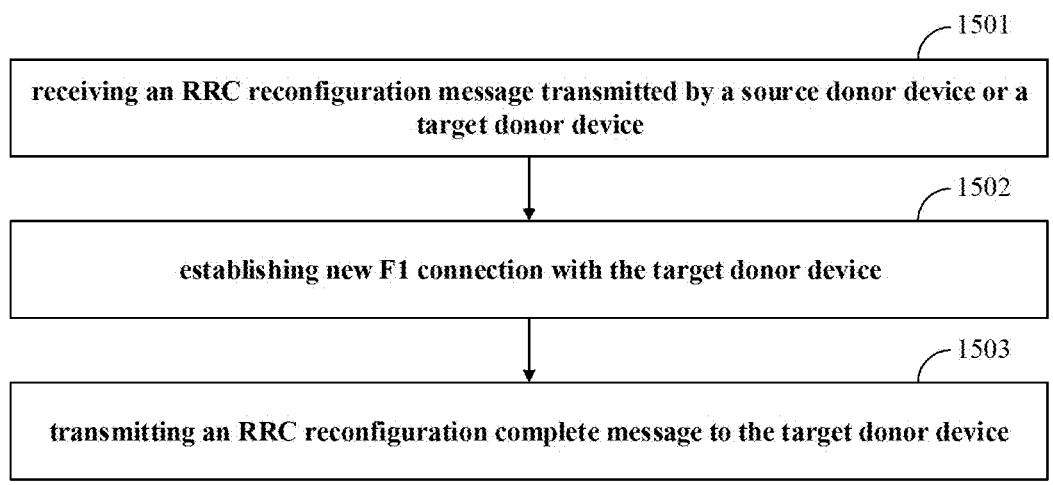
FIG. 15 is a schematic diagram of the group migration method of an embodiment of a third aspect of this disclosure.

FIG. 15 is a schematic diagram of the group migration method of the embodiment of this disclosure. As shown in FIG. 15, the method includes:

1501: receiving an RRC reconfiguration message transmitted by a source donor device or a target donor device;

1502: establishing new F1 connection with the target donor device; and

1503: transmitting an RRC reconfiguration complete message to the target donor device.

According to the method of the embodiment of this disclosure, when an IAB node migrates between different donor devices, a child IAB-node served by the IAB node may migrate along with it, without needing to reestablish the RRC connection with the target donor device in a manner of RRC reestablishment, which may reduce the service communication interruption time during the migration of the IAB node.

In the embodiment of this disclosure, in 1502, that the child IAB-node establishes new F1 connection with the target donor device may be that: the child IAB-node transmits an F1 establishment request message to the target donor to request to establish F1 connection with the target donor device; and receives an F1 establishment response message transmitted by the target donor device, thereby establishing the F1 connection with the target donor device.

In the embodiments of this disclosure, in some embodiments, after 1502, that is, after the new F1 connection is established, the child IAB-node may maintain the old F1 connection with the source donor device, and release the old F1 connection with the source donor device if one of the following conditions is satisfied, for example, after transmitting the RRC reconfiguration message to a grandchild IAB-node or UE served by the child IAB-node; or, after receiving an RRC reconfiguration complete message transmitted by the grandchild IAB-node or UE served by the child IAB-node; or, after a predetermined time after the new F1 connection with the target donor device is established.

In the embodiments of this disclosure, in some embodiments, after 1502, that is, after the new F1 connection is established, the child IAB-node may transmit the F1 release request message to the source donor device to release the old F1 connection with the source donor device.

In the embodiments of this disclosure, in some embodiments, the child IAB-node may further receive an F1AP (F1 application protocol) message transmitted by the target donor device via the new F1 connection, and transmit the RRC reconfiguration message to the grandchild IAB-node or UE. The F1AP message contains the RRC reconfiguration message for the grandchild IAB-node or UE served by the child IAB-node.

In the embodiments of this disclosure, in some embodiments, after 1503, that is, after the child IAB-node transmits the RRC reconfiguration complete message to the target donor device, the child IAB-node may further receive the BAP routing configuration configured by the target donor. Reference may be made to the embodiment of the first aspect for contents included in the BAP routing configuration, which shall not be repeated herein any further.

In the embodiments of this disclosure, in some embodiments, the child IAB-node may further receive the F1AP message transmitted by the source donor device via the old F1 connection with the child IAB-node, and transmit the RRC reconfiguration message to the served grandchild IAB-node or UE. The F1AP message contains the RRC reconfiguration message for the grandchild IAB-node or UE served by the child IAB-node.

In the above embodiment, after 1502, that is, after the new F1 connection is established, the child IAB-node transmits the RRC reconfiguration message to the served child IAB-node or UE, or, after the new F1 connection is established, the child IAB-node transfers the RRC reconfiguration complete message for the served grandchild IAB-node or UE to the target donor device. In this way, it may be ensured that the child IAB-node successfully transmits the RRC reconfiguration complete message for the served grandchild IAB-node or UE to the target donor device via the new F1 connection.

In the embodiment of this disclosure, the RRC reconfiguration message for the child IAB-node includes one of the following: a default uplink backhaul RLC channel identifier used in migrating to the target donor device; a default BAP routing identifier used in migrating to the target donor device; a BAP address used in migrating to the target donor device; a transport layer address used in migrating to the target donor device; and a security key configuration used in migrating to the target donor device.

In some embodiments, the above RRC reconfiguration message for the child IAB-node may further include: a BAP routing configuration used in migrating to the target donor device. Therefore, after the child IAB-node determines that the migrating IAB node has completed migrating to the target donor device and after transmitting the RRC reconfiguration complete message to the target donor device, the child IAB-node may apply the BAP routing configuration.

The embodiment of this disclosure provides a group migration method, which shall be described from a side of a terminal equipment served by a migrating IAB node in an IAB network, with contents identical to those in the embodiments of the first and second aspects being not going to be repeated herein any further.

Figure 16:
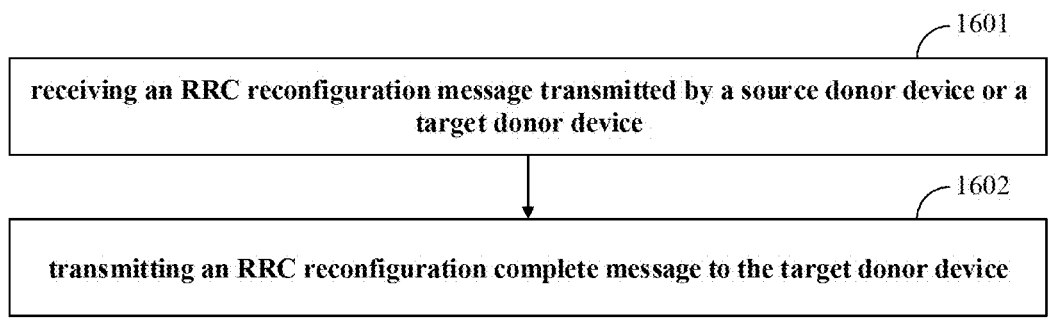
FIG. 16 is another schematic diagram of the group migration method of the embodiment of the third aspect of this disclosure.

FIG. 16 is another schematic diagram of the group migration method of the embodiment of this disclosure. As shown in FIG. 16, the method includes:

1601: receiving an RRC reconfiguration message transmitted by a source donor device or a target donor device; and

1602: transmitting an RRC reconfiguration complete message to the target donor device.

In the embodiment of this disclosure, the RRC reconfiguration message may include: a security key configuration used in migrating to the target donor device.

According to the method of the embodiment of this disclosure, when an IAB node migrates between different donor devices, the terminal equipment served by the IAB node may migrate along with it, without needing to reestablish the RRC connection with the target donor device in a manner of RRC reestablishment, which may reduce the service communication interruption time during the migration of the IAB node.

It should be noted that FIGS. 15 and 16 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 15 and 16.

According to the method of the embodiment of this disclosure, as described above, an interruption time of service communication during the migration of the IAB node may be reduced.

The group migration methods of the embodiments of this disclosure are described above through the embodiments of the first to the third aspects. In order to make the methods of the embodiments of this disclosure clearer and understandable, the methods of the embodiments of this disclosure shall be described below through information exchange processes corresponding to the above two scenarios.

Figure 17:
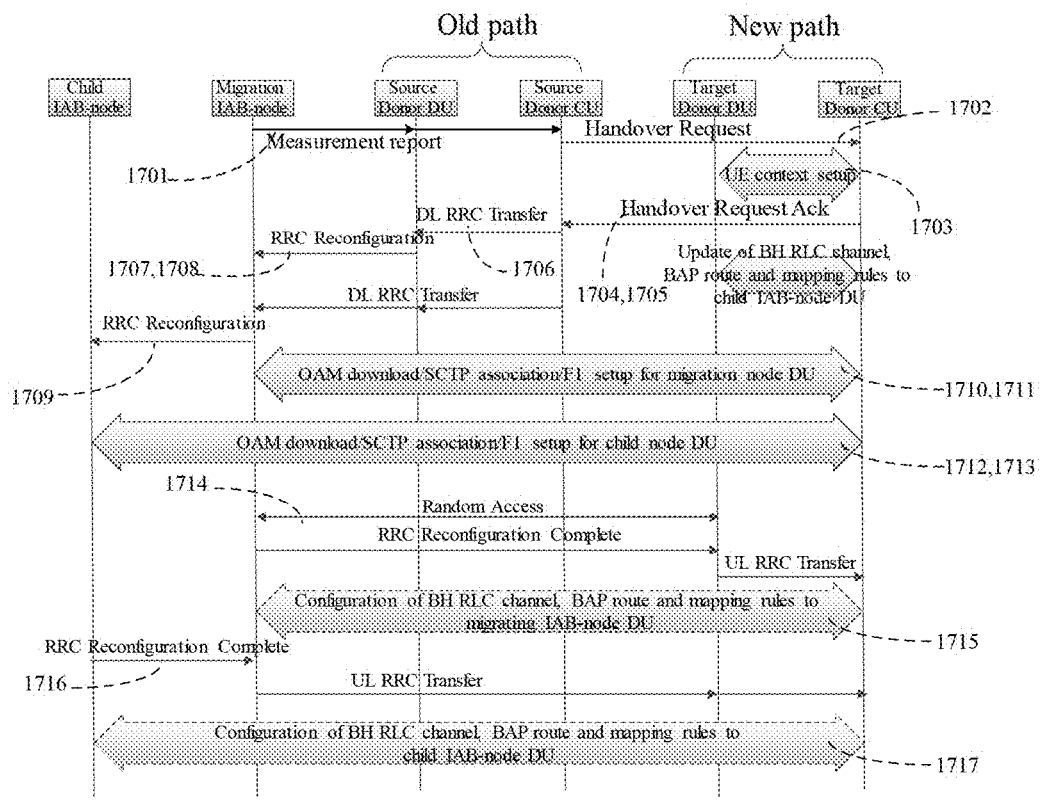
FIG. 17 is a flowchart of a scenario of an embodiment of this disclosure.

FIG. 17 is a flowchart of an information exchange process corresponding to the above scenario 1. In this scenario, migration of the IAB-MT of the migrating IAB-node, migration of the IAB-MT of the child IAB-node and migration of the UE served by the migrating IAB-node are performed simultaneously. The source donor may transmit the RRC reconfiguration message to the migrating IAB-node and a downstream child IAB-node and UE at the same time.

As shown in FIG. 17, the process includes:

1701: the source donor receives a measurement report transmitted by the migrating IAB-node, and determines that it is needed to migrate the migrating IAB-node to the target donor;

1702: the source donor transmits the first migration request message to the target donor, the first migration request message including the context information on the migrating IAB-node and the downstream child IAB-node and UE;

migration preparation information for each IAB-node and UE may be transmitted via different Xn messages, or may be transmitted in the same Xn message;

1703: the target donor transmits a UE CONTENT SETUP REQUEST message to a parent IAB-node of the migrating IAB-node under the target donor, and creates a context and radio bearer for the parent IAB-node of the migrating IAB-node under the target donor;

1704: the target donor receives a UE CONTENT SETUP RESPONSE message transmitted by the parent IAB-node of the migrating IAB-node under the target donor;

as the child IAB-node or UE is still connected to the migrating IAB-node after migration, the step of establishing the IAB-node or UE context and radio bearer for the child IAB-node or UE in the migrating IAB-node may be omitted;

1705: the target donor transmits a first response message to the source donor, the first response message including the RRC reconfiguration message for the migrating IAB-node, child IAB-node and UE;

the RRC reconfiguration messages for each IAB-node and UE may be transmitted via different Xn messages, or may be transmitted in the same Xn message;

1706: the source donor transmits a DL RRC MESSAGE TRANSFER or UE CONTEXT MODIFICATION REQUEST to the parent IAB-node of the migrating IAB-node under the source donor, which includes the RRC reconfiguration message for the migrating IAB-node;

the RRC reconfiguration message for the migrating IAB-node at least includes the following configuration information:

a new default uplink backhaul RLC channel identifier (used for an F1-control plane data or non-F1 data) used in migrating to the target donor;

a new default uplink BAP routing identifier (used for F1-control plane data or non-F1 data) used in migrating to the target donor;

a new transport layer (IP) address used in migrating to the target donor; and a new security key configuration used in migrating to the target donor;

in order not to affect services being transmitted, the RRC reconfiguration message may further include backhaul information used after migrating to the target donor, such as backhaul RLC channel mapping information and BAP routing configuration information configured by the target donor for the migrating IAB-node;

the backhaul RLC channel mapping information is, for example, a correspondence between a previous hop BAP address with ingress backhaul RLC channel identifier and a next hop BAP address with egress backhaul RLC channel identifier; and a backhaul RLC channel identifier used by a DRB of the UE served by the migrating IAB-node;

the BAP routing configuration information is, for example, a correspondence between the BAP routing identifier and the next hop BAP address; and the BAP routing identifier used by the DRB of the UE served by the migrating IAB-node and the next hop BAP address;

1707: the source donor transmits the RRC reconfiguration message to the migrating IAB-node, and then the migrating IAB-node may continue to provide original air interface access services to the child IAB-node or UE, or may stop the original air interface access services;

1708: the source donor transmits an F1AP message (DL RRC MESSAGE TRANSFER or UE CONTEXT MODIFICATION REQUEST) via the F1 connection with the migrating IAB-node, which includes the RRC reconfiguration message for the child IAB-node or UE;

the RRC reconfiguration message for the child IAB-node includes, for example, a default BAP routing configuration (used for F1-control plane data or non-F1 data) used in migrating to the target donor device; a BAP address used in migrating to the target donor device; a transport layer (IP) address configuration used in migrating to the target donor device; and a security key configuration used in migrating to the target donor;

as the child IAB-node is still connected to the migrating IAB-node DU after migration, the default uplink backhaul RLC channel identifier for the F1-control plane data or non-F1 data may possibly not be changed, the RRC reconfiguration message does not necessarily include the new default uplink backhaul RLC channel identifier;

likewise, in order not to affect services being transmitted, the RRC reconfiguration message for the child IAB-node may further include the BAP routing configuration used after migrating to the target donor;

the BAP routing configuration information is, for example, a correspondence between the BAP routing identifier and the next hop BAP address; and the BAP routing identifier used by the DRB of the UE served by the migrating IAB node and the next hop BAP address;

as the child IAB-node does not necessarily need to change the RLC channel mapping relationship of the F1-user plane or child node backhaul data before and after the migration, it is not needed to reconfigure RLC channel mapping information.

furthermore, the RRC reconfiguration message for UE at least includes a security key configuration used in migrating to the target donor; as the migrating IAB-node does not necessarily change a PCI (physical cell identity) of the serving cell and frequency point before and after migration, the target donor only needs to configure a new security key for the UE;

1709: the migrating IAB-node transfers the RRC reconfiguration message to the child IAB-node or UE;

there is no precedence relationship between steps 1706, 1707 and steps 1708, 1709; for example, step 1708 may be executed before step 1706;

1710: the migrating IAB-node connects to OAM via the target donor by using the configured new transport layer (IP) address, downloads OAM data, and establishes new SCTP connection with the target donor;

1711: the migrating IAB-node transmits an F1AP message (F1 setup request message) to the target donor via the new SCTP connection, and receives an F1 setup response transmitted by the target donor, and establishes new F1 connection with the target donor;

if the migrating IAB-node does not connect to the parent IAB-node under the target donor, the messages in steps 1710 and 1711 may be transferred to the target donor via an original path (old path), that is, a transmission path of the messages in steps 1710 and 1711 is: the migrating IAB-node→the source donor→the target donor;

in the above example, after the migrating IAB establishes the new F1 connection, it may be used as the IAB-node under the target donor, so as to provide new air interface access services for the child IAB-node or UE;

1712: the child IAB-node connects to OAM via the target donor by using the configured new transport layer (IP) address, downloads OAM data, and establishes new SCTP connection with the target donor;

1713: the child IAB-node transmits an F1AP message (F1 setup request message) to the target donor via the new SCTP connection, receives an F1 setup response transmitted by the target donor, and establishes new F1 connection with the target donor;

if the migrating IAB-node does not connect to the target parent IAB-node at this moment, the messages in steps 1712 and 1713 may be transferred to the target donor via the original path, that is, a transmission path of the messages in steps 1712 and 1713 is: child IAB-node→the migrating IAB-node→the source donor→the target donor;

in the above example, there is no precedence relationship between steps 1710, 1711 and steps 1712, 1713; for example, it is only needed that step 1710 is executed after step 1707, and step 1712 is executed after step 1709;

1714: the migrating IAB-node initiates random access to the parent IAB-node under the target donor and transmits an RRCReconfigurationComplete message, the parent IAB-node under the target donor places this message in an F1AP message (UL RRC MESSAGE TRANSFER) and transfers it to the target donor, and then the migrating IAB-node may transmit signaling or data generated by itself via the new uplink backhaul RLC channel and the new default BAP path;

in the above example, it is only needed that step 1714 is executed after step 1707;

1715: the target donor configures the new backhaul RLC channel mapping and BAP routing configuration for the migrating IAB-node via the F1AP message, and then the migrating IAB-node may transmit signaling or data of the served UE and child IAB-node via the new backhaul RLC channel and the new BAP path;

if the RRC reconfiguration message for the migrating IAB-node in step 1706 contains the new backhaul RLC channel mapping and BAP routing configuration, step 1715 is optional;

1716: the child IAB-node or UE transmits the RRCReconfigurationComplete message to the migrating IAB-node, the migrating IAB-node places this message in an F1AP message (UL RRC MESSAGE TRANSFER) and transfers it to the target donor via the new F1 connection, and then the child IAB-node transmits signaling or data generated by itself via the new default BAP path; and

1717: the target donor configures new BAP routing for the child IAB-node via the F1AP message, then the child IAB-node may transmit signaling or data of the served UE and IAB-node (referred to as a grandchild IAB-node) via the new BAP path;

if the RRC reconfiguration message for the migrating IAB-node in step 1708 contains the new BAP routing configuration, step 1717 is optional.

In the above example, steps 1715 and 1717 need to be completed after step 1714, that is, after the target donor receives RRCReconfigurationComplete transmitted by the migrating IAB-node.

In the example in FIG. 17, the migrating IAB-node, the child IAB-node and the UE served by the migrating IAB-node migrate at the same time, and as multiple steps may be executed in parallel, the overall migration process takes a relatively short time.

It should be noted that in the above example, if the PCI and frequency are not changed after the migrating IAB-node migrates to the target donor, in order to successfully transmit the RRCReconfigurationComplete message for the child IAB-node or UE to the target donor, step 1716 needs to be executed after step 1711, or step 1709 may be executed after step 1711, that is, after the migrating IAB-node establishes the new F1 connection with the target donor.

In addition, if the PCI or frequency is changed after the migrating IAB-node migrates to the target donor, after the migrating IAB-node establishes the new F1 connection with the target donor, it provides new air interface access services as a DU under the target donor, and applies a new PCI or frequency. In this way, the child IAB-node or UE may transmit the RRCReconfigurationComplete message after detecting a cell reference signal of a new PCI or new frequency of the migrating IAB-node, thereby ensuring successful migration.

Figure 18:
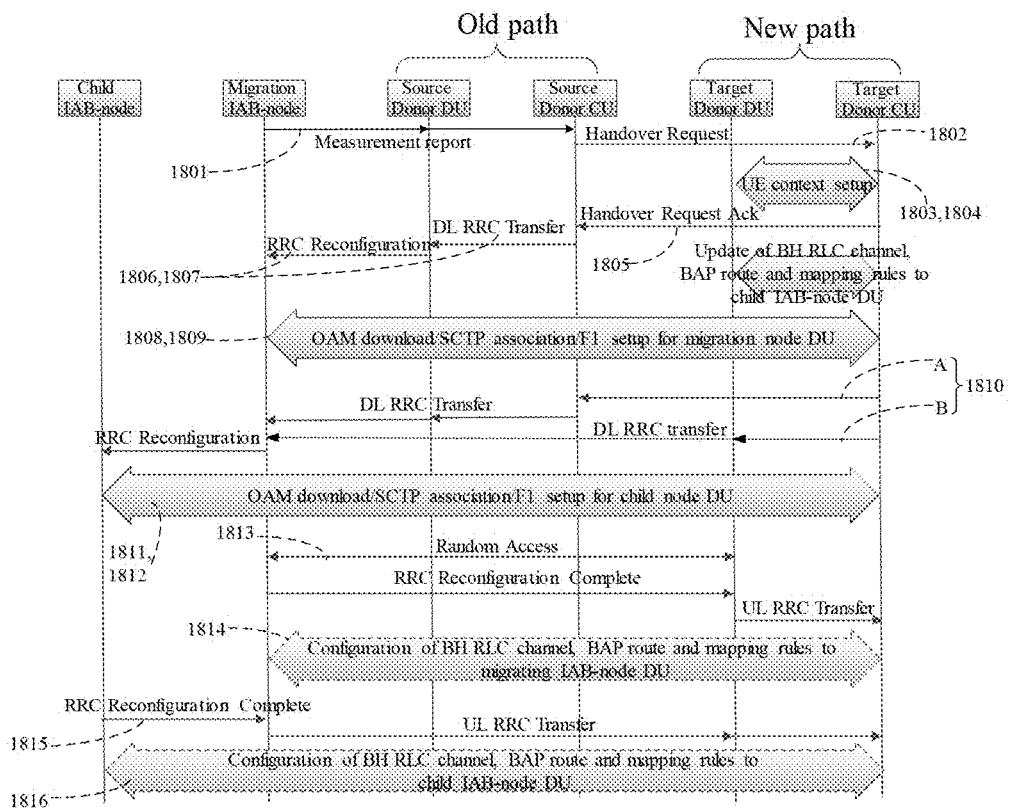
FIG. 18 is a flowchart of another scenario of the embodiment of this disclosure.

FIG. 18 is a flowchart of an information exchange process corresponding to the above scenario 2. In this scenario, the child IAB-node and UE served by the migrating IAB-node may perform migration only after migration of the IAB-DU or IAB-MT of the migrating IAB-node. After the target donor establishes new F1 connection with the migrating IAB-node, or after the target donor receives the RRCReconfigurationComplete message transmitted by the migrating IAB-node, the source donor or target donor transmits the RRC reconfiguration message to the child IAB-node and UE.

As shown in FIG. 18, the process includes:

1801: the source donor receives a measurement report transmitted by the migrating IAB-node MT, and determines that it is needed to migrate the migrating IAB-node to the target donor;

1802: the source donor transmits the first migration request message to the target donor, the first migration request message including the context information on the migrating IAB-node and the child IAB-node and UE;

the context information for each IAB-node and UE may be transmitted via different Xn messages, or may be transmitted in the same Xn message;

in this embodiment, the first migration request in this step may only contain the context information for the migrating IAB-node, and the context information on the IAB-node and UE is transmitted to the target donor after the target donor establishes new F1 connection with the migrating IAB-node, or after the target donor receives the RRCReconfigurationComplete message transmitted by the migrating IAB-node;

1803: the target donor transmits a UE CONTENT SETUP REQUEST message to a parent IAB-node of the migrating IAB-node under the target donor, and creates a context and radio bearer for the parent IAB-node of the migrating IAB-node under the target donor;

1804: the target donor receives a UE CONTENT SETUP RESPONSE message transmitted by the parent IAB-node of the migrating IAB-node under the target donor;

as the child IAB-node or UE is still connected to the migrating IAB-node after migration, the step of establishing the IAB-node or UE context and radio bearer for the child IAB-node or UE in the migrating IAB-node DU may be omitted;

1805: the target donor transmits a first response message to the source donor, the first response message including the RRC reconfiguration message for the migrating IAB-node, child IAB-node and UE;

the RRC reconfiguration messages for each IAB-node and UE may be transmitted via different Xn messages, or may be transmitted in the same Xn message;

in this embodiment, if the target donor transmits the RRC reconfiguration message for the child IAB-node or UE via the new F1 connection with the migrating node, the first response message of this step may only include the RRC reconfiguration message (i.e. a migration command) for the migrating IAB-node;

1806: the source donor transmits an F1AP message (a DL RRC MESSAGE TRANSFER or UE CONTEXT MODIFICATION REQUEST) to the parent IAB-node of the migrating IAB-node under the source donor, which includes the RRC reconfiguration message for the migrating IAB-node;

the RRC reconfiguration message for the migrating IAB-node includes:

a new default uplink backhaul RLC channel identifier (used for F1-control plane data and non-F1 data) used in migrating to the target donor;

a new default uplink BAP routing identifier (used for F1-control plane data and non-F1 data) used in migrating to the target donor;

a new transport layer (IP) address configuration used in migrating to the target donor; and a new security key configuration used in migrating to the target donor device;

in order not to affect services being transmitted, the RRC reconfiguration message may further include backhaul information used after migrating to the target donor, such as backhaul RLC channel mapping information and BAP routing configuration information configured by the target donor for the migrating IAB-node;

the backhaul RLC channel mapping information includes, for example, a correspondence between a previous hop BAP address with ingress backhaul RLC channel identifier and a next hop BAP address with egress backhaul RLC channel identifier; and a backhaul RLC channel identifier used by a DRB of the UE served by the migrating IAB-node;

the BAP routing configuration information includes, for example, a correspondence between the BAP routing identifier and the next hop BAP address; and the BAP routing identifier used by the DRB of the UE served by the migrating IAB-node and the next hop BAP address;

1807: the source donor transmits the RRC reconfiguration message to the migrating IAB-node; as it is needed to transmit the RRC reconfiguration message to the child IAB-node or UE, the migrating IAB-node needs to continue to provide original air interface access services to the child IAB-node or UE;

1808: the migrating IAB-node connects to OAM via the target donor by using the configured new transport layer (IP) address, downloads OAM data, and establishes new SCTP connection with the target donor;

1809: the migrating IAB-node transmits an F1AP message (F1 setup request) to the target donor via the new SCTP connection, receives an F1 setup response message transmitted by the target donor, and establishes new F1 connection with the target donor;

if the migrating IAB-node does not connect to the parent IAB-node under the target donor, the messages in steps 1810 and 1811 may be transferred to the target donor via an original path (old path), that is, a transmission path of the messages in steps 1810 and 1811 is: the migrating IAB-node→the source donor→the target donor;

in this example, after the migrating IAB-node establishes the new F1 connection, it may be used as the IAB-node under the target donor, so as to provide new air interface access services for the child IAB-node or UE;

1810: after the target donor establishes the new F1 connection with the migrating IAB-node, there are two methods to transmit the RRC reconfiguration message for the child IAB-node or UE:

method 1 (A): the source donor transmits the F1AP message (DL RRC MESSAGE TRANSFER or UE CONTEXT MODIFICATION REQUEST) to the migrating IAB-node via the old F1 connection, including the RRC reconfiguration message for the child IAB-node or UE, and the migrating IAB-node transfers the RRC reconfiguration message to the child IAB-node or UE;

this method is applicable to a scenario where the F1 connection between the migrating IAB-node and the source donor is still maintained after the new F1 connection is established; for example, there are three methods for implementation:

method 1: the target donor transmits a second response message containing the RRC reconfiguration message for the child IAB-node or the served UE to the source donor, so that the source donor transmits the RRC reconfiguration message for the child IAB-node or the UE;

method 2: the target donor transmits a first indication message to the source donor to trigger the source donor to transmit the RRC reconfiguration message for the child IAB-node or UE; and method 3: the target donor transmits a second indication message to the source donor to trigger the source donor to transmit an Xn message containing the context information on the child IAB-node or UE to the target donor, so that the target donor transmits the RRC reconfiguration message for the child IAB-node or UE to the source donor, so that the source donor transmits the RRC reconfiguration message for the child IAB-node or UE;

method 2 (B): the target donor transmits the F1AP message (DL RRC MESSAGE TRANSFER or UE CONTEXT MODIFICATION REQUEST) to the migrating IAB-node via the new F1 connection, including the RRC reconfiguration messages for the child IAB-node or UE, and the migrating IAB-node transfers the RRC reconfiguration message to the child IAB-node or UE;

this method is applicable to a scenario where the old F1 connection between the migrating IAB-node and the source donor is released after the new F1 connection is established;

in the above example, the RRC reconfiguration message for the child IAB-node includes: a default BAP routing identifier used in migrating to the target donor device; a BAP address used in migrating to the target donor device; a transport layer (IP) address used in migrating to the target donor; and a security key configuration used in migrating to the target donor;

in the above example, the RRC reconfiguration message for UE at least includes a security key configuration used in migrating to the target donor; as the migrating IAB-node does not necessarily change a PCI (physical cell identity) of the serving cell and frequency point before and after migration, the target donor only needs to configure a new security key for the UE;

1811: the child IAB-node connects to OAM via the target donor by using the configured new transport layer (IP) address, downloads OAM data, and establishes new SCTP connection with the target donor;

1812: the child IAB-node transmits an F1AP message (F1 setup request) to the target donor via the new SCTP connection, receives an F1 setup response transmitted by the target donor, and establishes new F1 connection with the target donor;

if the migrating IAB-node does not connect to the parent IAB-node under the target donor, the messages in steps 1812 and 1813 may be transferred to the target donor via an original path, that is, a transmission path of the messages in steps 1812 and 1813 is: the child IAB-node→the migrating IAB-node→the source donor→the target donor;

in the above example, after the migrating IAB establishes the new F1 connection, it may be used as the IAB-node under the target donor, so as to provide new air interface access services for the child IAB-node or UE;

1813: the migrating IAB-node initiates random access to the parent IAB-node under the target donor and transmits an RRCReconfigurationComplete message, the parent IAB-node under the target donor places this message in an F1AP message (UL RRC MESSAGE TRANSFER) and transfers it to the target donor, and then the migrating IAB-node transmits signaling or data generated by itself via the new uplink backhaul RLC channel and the new default BAP path;

in the above example, it is only needed that step 1813 is executed after step 1807;

1814: the target donor configures the new backhaul RLC channel mapping and BAP routing configuration for the migrating IAB-node via the F1AP message, and then the migrating IAB-node transmits the signaling or data of the served UE and child IAB-node via the new backhaul RLC channel and the new BAP path;

if the RRC reconfiguration message for the migrating IAB-node in step 1806 contains the new backhaul RLC channel mapping and BAP routing configuration, step 1814 is optional;

1815: the child IAB-node transmits the RRCReconfigurationComplete message to the migrating IAB-node, the migrating IAB-node places this message in an F1AP message (UL RRC MESSAGE TRANSFER) and transfers it to the target donor, and then the child IAB-node may transmit signaling or data generated by itself via the new default BAP path; and

1816: the target donor configures new BAP routing for the child IAB-node via the F1AP message, then the child IAB-node may transmit signaling or data of the served UE and grandchild IAB-node via the new BAP path;

if the RRC reconfiguration message for the migrating IAB-node in step 1810 contains the new BAP routing configuration, step 1816 is optional.

In the above example, steps 1814 and 1816 need to be completed after step 1813, that is, after the target donor receives RRCReconfigurationComplete transmitted by the migrating IAB-node.

In the example in FIG. 18, the migrating IAB-node transmits the RRC reconfiguration message to the child IAB-node or UE only after the migrating IAB-node establishes the new F1 connection with the target donor. This may ensure that the migrating IAB-node transmits the RRCReconfigurationComplete message to the child IAB-node or UE after the migrating IAB-node establishes the new F1 connection with the target donor, so that successful migration may be ensured in a scenario where the migrating IAB-node does not change a PCI and frequency point.

In the examples in FIG. 17 and FIG. 18, releasing the old F1 connection between the migrating IAB-node or child IAB-node and the source donor is also concerned.

In some embodiments, the old F1 connection between the migrating IAB-node or the child IAB-node and the source donor may still be maintained after the new F1 connection is established. Release conditions are as follows:

condition 1: releasing the old F1 connection with the source donor after transmitting the RRC reconfiguration message to all child IAB-nodes and served UEs; the source donor has transmitted the F1 message containing the RRC reconfiguration for the downstream child IAB-node or UE via the old F1 connection, and does not need to continue to use the old F1 connection;

condition 2: releasing the old F1 connection with the source donor after receiving the RRCReconfigurationComplete transmitted by all child IAB-nodes and the served UE;

as the child IAB-node or UE may possibly fail in migrating or reconfiguring, the child IAB-node and the served UE will release the original F1 connection after completing the RRC reconfiguration, which may ensure that the child IAB-node or UE may turn back to the source donor when the migration fails;

condition 3: releasing the original F1 connection after a preset time after the new F1 connection is established, so as to ensure that the source donor has transmitted the F1 message containing the RRCReconfiguration for the downstream IAB-node or UE via the old F1 connection; for example, a timer is started, and the old F1 connection is released after the timer expires.

In some embodiments, the old F1 connection between the migrating IAB-node or the child IAB-node and the source donor may be released immediately after the new F1 connection is established.

In this case, the migrating IAB-node needs only to maintain one F1 connection, and does not need to maintain the old F1 connection with the source donor after the new F1 connection is established. The target donor may directly transmit the RRC reconfiguration message for its downstream child IAB-node or UE to the migrating IAB-node or child IAB-node via the new F1 connection, rather than transmitting the RRC reconfiguration message to the source donor, and transmits the RRC reconfiguration message for the child IAB-node or UE via the original F1 connection, and reference may be made to B in example 2. This may reduce a transmission time of a migration command (i.e. the RRC reconfiguration message).

Embodiment of a Fourth Aspect

The embodiment of this disclosure provides a group migration apparatus.

Figure 19:
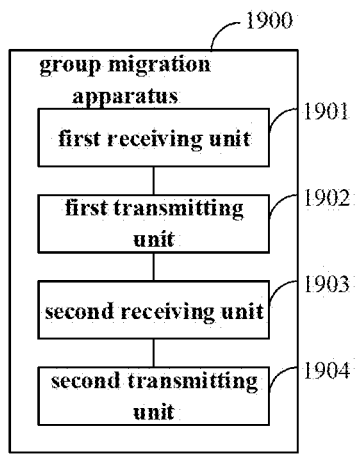
FIG. 19 is a schematic diagram of the group migration apparatus of an embodiment of a fourth aspect of this disclosure.

FIG. 19 is a schematic diagram of the group migration apparatus of the embodiment of this disclosure. The apparatus may be, for example, a donor device in an IAB network, such as a donor device before migration of a migrating IAB node, referred to as a source donor device, or one or some components or assemblies configured in the donor device. As principles of implementation of the apparatus are similar to that of the method in FIG. 8 of the first embodiment, identical contents being not going to be repeated herein any further. As shown in FIG. 19, the group migration apparatus 1900 of the embodiment of this disclosure includes:

a first receiving unit 1901 configured to receive a measurement report transmitted by a migrating IAB node;

a first transmitting unit 1902 configured to transmit a first migration request message to a target donor device, the first migration request message including context information on the migrating IAB node and its served child IAB-node or UE;

a second receiving unit 1903 configured to receive a first response message transmitted by the target donor device, the first response message including an RRC reconfiguration message for the migrating IAB node and its served child IAB-node or UE; and a second transmitting unit 1904 configured to transmit the RRC reconfiguration message to the migrating IAB node and its served child IAB-node or UE.

Figure 20:
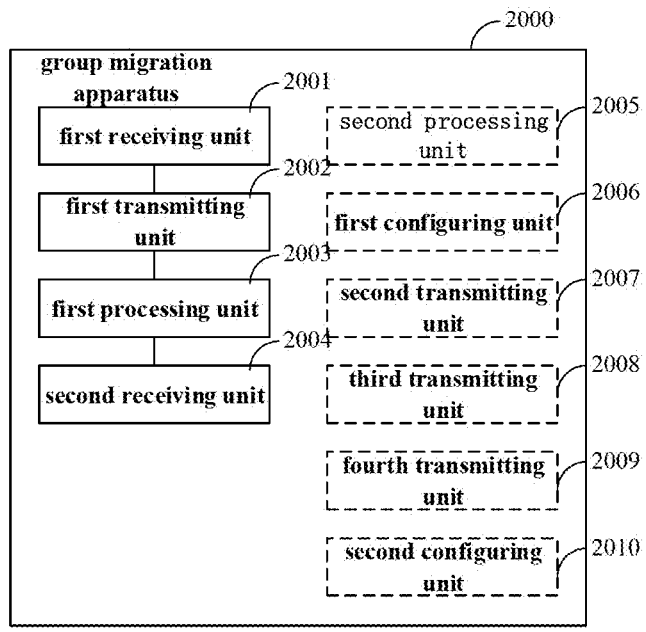
FIG. 20 is another schematic diagram of the group migration apparatus of the embodiment of the fourth aspect of this disclosure.

FIG. 20 is a schematic diagram of the group migration apparatus of the embodiment of this disclosure. The apparatus may be, for example, a donor device in an IAB network, such as a donor device after migration of a migrating IAB node, referred to as a target donor device, or one or some components or assemblies configured in the target device. As principles of implementation of the apparatus are similar to that of the method in FIG. 9 of the first embodiment, identical contents being not going to be repeated herein any further. As shown in FIG. 20, the group migration apparatus 2000 of the embodiment of this disclosure includes:

a first receiving unit 2001 configured to receive a first migration request message transmitted by a source donor device, the first migration request message including context information on a migrating IAB node and its served child IAB-node or UE;
a first transmitting unit 2002 configured to transmit a first response message to the source donor device, the first response message including an RRC reconfiguration message for the migrating IAB node and its served child IAB-node or UE;
a first processing unit 2003 configured to establish new F1 connection with the migrating IAB node; and
a second receiving unit 2004 configured to receive an RRC reconfiguration complete message transmitted by the migrating IAB node and its served child IAB-node or UE.

Figure 21:
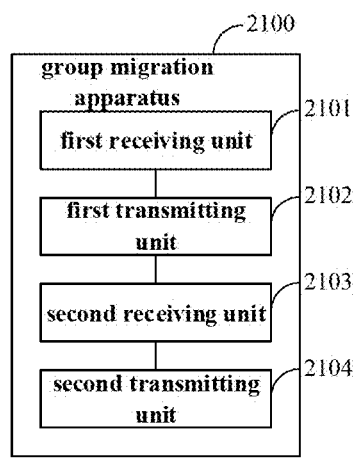
FIG. 21 is a further schematic diagram of the group migration apparatus of the embodiment of the fourth aspect of this disclosure.

FIG. 21 is a schematic diagram of the group migration apparatus of the embodiment of this disclosure. The apparatus may be, for example, a donor device in an IAB network, such as a donor device before migration of a migrating IAB node, referred to as a source donor device, or one or some components or assemblies configured in the donor device. As principles of implementation of the apparatus are similar to that of the method in FIG. 10 of the first embodiment, identical contents being not going to be repeated herein any further. As shown in FIG. 21, the group migration apparatus 2100 of the embodiment of this disclosure includes:
a first receiving unit 2101 configured to receive a measurement report transmitted by a migrating IAB node;
a first transmitting unit 2102 configured to transmit a first migration request message to a target donor device, the first migration request message including context information on the migrating IAB node and its served child IAB-node or UE;
a second receiving unit 2103 configured to receive a first response message transmitted by the target donor device, the first response message including an RRC reconfiguration message for the migrating IAB node; and
a second transmitting unit 2104 configured to transmit the RRC reconfiguration message to the migrating IAB node.

Figure 22:
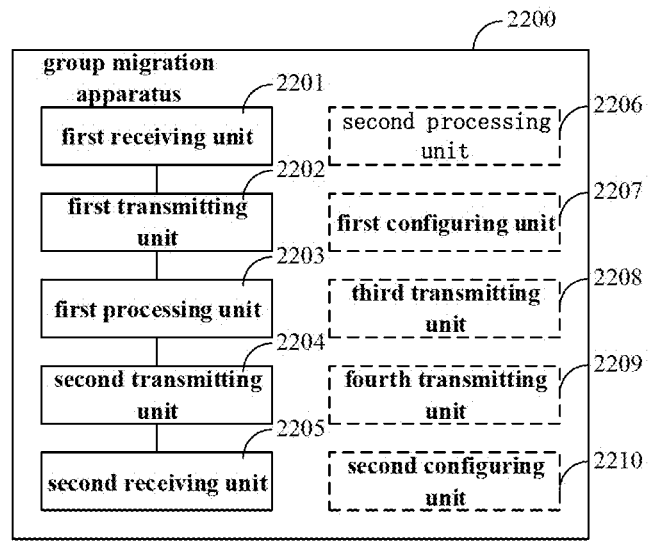
FIG. 22 is still another schematic diagram of the group migration apparatus of the embodiment of the fourth aspect of this disclosure.

FIG. 22 is a schematic diagram of the group migration apparatus of the embodiment of this disclosure. The apparatus may be, for example, a donor device in an IAB network, such as a donor device after migration of a migrating IAB node, referred to as a target donor device, or one or some components or assemblies configured in the donor device. As principles of implementation of the apparatus are similar to that of the method in FIG. 11 of the first embodiment, identical contents being not going to be repeated herein any further. As shown in FIG. 22, the group migration apparatus 2200 of the embodiment of this disclosure includes:
a first receiving unit 2201 configured to receive a first migration request message transmitted by a source donor device, the first migration request message including context information on a migrating IAB node and its served child IAB-node or UE;
a first transmitting unit 2202 configured to transmit a first response message to the source donor device, the first response message including an RRC reconfiguration message for the migrating IAB node;
a first processing unit 2203 configured to establish new F1 connection with the migrating IAB node;
a second transmitting unit 2204 configured to transmit the RRC reconfiguration message to the child IAB-node or UE served by the migrating IAB node via the F1 connection; and
a second receiving unit 2205 configured to receive an RRC reconfiguration complete message transmitted by the migrating IAB node and its served child IAB-node or UE.

In the embodiment of this disclosure, the context information on the migrating IAB node includes: an IAB-DU context and an IAB-MT context of the migrating IAB node, and the context information on the child IAB-node includes an IAB-DU context and an IAB-MT context of the child IAB-node.

In some embodiments, the IAB-DU context of the migrating IAB node includes: serving cell information of the IAB-DU of the migrating IAB node under the source donor device. The serving cell information includes at least one of the following: a new radio cell global identifier (NR CGI); a new radio physical cell identifier (NR PCI); a public land mobile network (PLMN) served by the IAB-DU; and an uplink and downlink transmission frequency point and bandwidth.

In some embodiments, the IAB-MT context of the migrating IAB node includes BAP configuration information; the BAP configuration information includes a BAP address, a transport layer (IP) address, a default uplink backhaul RLC channel identifier and/or a default uplink BAP routing identifier allocated by the source donor device for the IAB node; the default uplink BAP routing identifier refers to a default destination BAP address and a default path identifier.

In the embodiments of this disclosure, in some embodiments, the first migration request message further includes backhaul information configured by the source donor device for the migrating IAB node or the child IAB-node.

In some embodiments, the backhaul information includes at least one of the following:
a correspondence between a previous hop BAP address with ingress backhaul RLC channel identifier and a next hop BAP address with egress backhaul RLC channel identifier; and
a correspondence between a BAP routing identifier configured by the source donor device for a migrating IAB node or a child IAB-node and a next hop BAP address.

In some embodiments, the backhaul information includes:
a BAP routing identifier used by a DRB of a UE served by the migrating IAB node or the child IAB-node, a next hop BAP address and a backhaul RLC channel identifier, and
a BAP routing identifier used by F1-control plane data or non-F1 data, a next hop BAP address and a backhaul RLC channel identifier.

In the above embodiment, the BAP routing identifier includes a destination BAP address and a path identifier.

In the embodiments of this disclosure, in some embodiments, the first migration request message further includes topology information, the topology information including a topology relationship between the migrating IAB node and its served child IAB-node or UE, or including a topology relationship between the child IAB-node and a grandchild IAB-node or UE served by the child IAB-node.

In the embodiments of this disclosure, in some embodiments, the first migration request message further includes address request information, which is used to request the target donor device to allocate a new transport layer (IP) address or a BAP address for the migrating IAB node or the child IAB-node.

In the above embodiment, the establishing new F1 connection with the migrating IAB node, includes: receiving an F1 establishment request message transmitted by the migrating IAB node; and transmitting an F1 establishment response message to the migrating IAB node.

In the embodiments of this disclosure, in some embodiments, as shown in FIG. 20 and FIG. 22, the apparatus 2000/2200 further includes:

- a second processing unit 2005/2206 configured to establish new F1 connection with the child IAB-node.

In the embodiments of this disclosure, in some embodiments, as shown in FIG. 20 and FIG. 22, the apparatus 2000/2200 further includes:

- a first configuring unit 2006/2207 configured to configure backhaul RLC channel mapping and a BAP routing configuration for the migrating IAB node after the target donor device receives the RRC reconfiguration complete message transmitted by the migrating IAB node.

In the embodiment of this disclosure, in some embodiments, as shown in FIG. 20, the apparatus 2000 further includes:

- a second transmitting unit 2007 configured to transmit the first indication message to the source donor device after the target donor device receives the RRC reconfiguration complete message transmitted by the migrating IAB node or establishes new F1 connection with the migrating IAB node, wherein the first indication message is used to indicate the source donor device to transmit the RRC reconfiguration message to the child IAB-node or UE.

In the embodiment of this disclosure, the context information on the migrating IAB node and the context information on the child IAB-node or UE are contained in same Xn messages or different Xn messages.

In the above embodiment, as shown in FIG. 20 and FIG. 22, the apparatus 2000/2200 further includes:

- a third transmitting unit 2008/2208 configured to transmit a second indication message to the source donor device after the target donor device receives the RRC reconfiguration complete message transmitted by the migrating IAB node or establishes new F1 connection with the migrating IAB node; the second indication message is used to indicate the source donor device to transmit an Xn message containing a context of the child IAB-node or UE to the target donor device.

In the embodiment of this disclosure, the RRC reconfiguration message for the migrating IAB node and the RRC reconfiguration message for the child IAB-node or UE are contained in same Xn messages or different Xn messages.

In the above embodiment, as shown in FIG. 20 and FIG. 22, the apparatus 2000/2200 further includes:

- a fourth transmitting unit 2009/2209 configured to transmit an Xn message containing the RRC reconfiguration message for the child IAB-node or UE to the source donor device after the target donor device receives the RRC reconfiguration complete message transmitted by the migrating IAB node or establishes new F1 connection with the migrating IAB node.

In the above embodiment, as shown in FIG. 20 and FIG. 22, the apparatus 2000/2200 further includes:

- a second configuring unit 2010/2210 configured to configure the child IAB-node with BAP routing configuration after the target donor device receives the RRC reconfiguration complete message transmitted by the migrating IAB node and the RRC reconfiguration complete message transmitted by the child IAB-node.

In the embodiment of this disclosure, the RRC reconfiguration message for the migrating IAB node includes at least one of the following: a default uplink backhaul RLC channel identifier used in migrating to the target donor device; a default BAP routing identifier used in migrating to the target donor device; a BAP address used in migrating to the target donor device; a transport layer address used in migrating to the target donor device; and a security key configuration used in migrating to the target donor device.

In some embodiments, the RRC reconfiguration message for the migrating IAB node further includes: backhaul RLC channel mapping and a BAP routing configuration used in migrating to the target donor device.

In the embodiment of this disclosure, the RRC reconfiguration message for the child IAB-node includes at least one of the following: a default BAP routing identifier used in migrating to the target donor device; a BAP address used in migrating to the target donor device; a transport layer address used in migrating to the target donor device; and a security key configuration used in migrating to the target donor device.

In some embodiments, the RRC reconfiguration message for the child IAB-node further includes: a BAP routing configuration used in migrating to the target donor device.

In the embodiment of this disclosure, in some embodiment, the RRC reconfiguration message for the UE includes: a security key configuration used in migrating to the target donor device.

It should be noted that the components or modules related to this disclosure are only described above. However, this disclosure is not limited thereto, and the group migration apparatus 1900/2000/2100/2200 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIGS. 19-22. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

According to the method of the embodiment of this disclosure, as described above, an interruption time of service communication during the migration of the IAB node may be reduced.

Embodiment of a Fifth Aspect

The embodiment of this disclosure provides a group migration apparatus. The apparatus may be, for example, an IAB-node to be migrated in an IAB network, referred to as a migrating IAB-node, or one or some components or assemblies configured in the migrating IAB-node.

Figure 23:
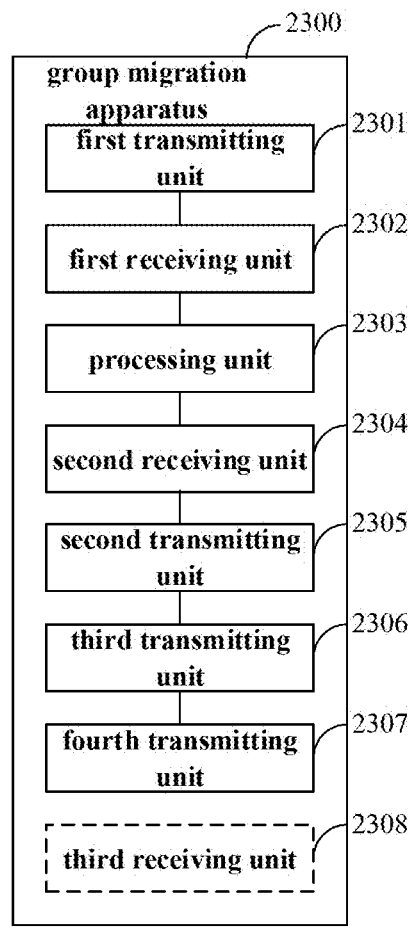
FIG. 23 is a schematic diagram of the group migration apparatus of an embodiment of a fifth aspect of this disclosure.

FIG. 23 is a schematic diagram of the group migration apparatus of the embodiment of this disclosure. As principles of the apparatus for solving problems are similar to that of the method in FIG. 13 of the second embodiment, reference may be made to the method in FIG. 13, identical contents being not going to be repeated herein any further. As shown in FIG. 23, the group migration apparatus 2300 of the embodiment of this disclosure includes:

- a first transmitting unit 2301 configured to transmit a measurement report to a source donor device;
- a first receiving unit 2302 configured to receive an RRC reconfiguration message transmitted by the source donor device;

a processing unit 2303 configured to establish new F1 connection with a target donor device;

a second receiving unit 2304 configured to receive an RRC reconfiguration message for a child IAB-node or UE served by the migrating IAB node transmitted by the source donor device via old F1 connection;

a second transmitting unit 2305 configured to transmit the RRC reconfiguration message to the child IAB-node or UE;

a third transmitting unit 2306 configured to transmit an RRC reconfiguration complete message to the target donor device; and a fourth transmitting unit 2307 configured to transfer to the target donor device an RRC reconfiguration complete message transmitted by the child IAB-node or UE.

Figure 24:
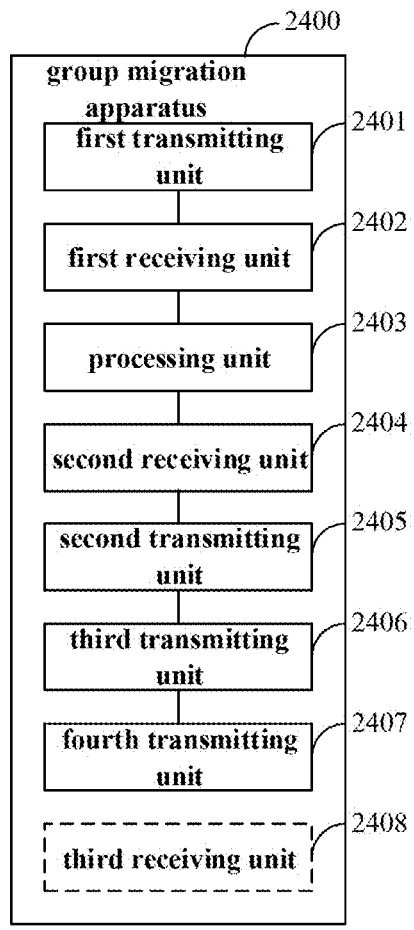
FIG. 24 is another schematic diagram of the group migration apparatus of the embodiment of the fifth aspect of this disclosure.

FIG. 24 is a schematic diagram of the group migration apparatus of the embodiment of this disclosure. As principles of the apparatus for solving problems are similar to that of the method in FIG. 14 of the second embodiment, reference may be made to the method in FIG. 14, identical contents being not going to be repeated herein any further. As shown in FIG. 24, the group migration apparatus 2400 of the embodiment of this disclosure includes:

a first transmitting unit 2401 configured to transmit a measurement report to a source donor device;

a first receiving unit 2402 configured to receive an RRC reconfiguration message transmitted by the source donor device;

a processing unit 2403 configured to establish new F1 connection with a target donor device;

a second receiving unit 2404 configured to receive an RRC reconfiguration message for a child IAB-node or UE served by the migrating IAB node transmitted by the target donor device via the new F1 connection;

a second transmitting unit 2405 configured to transmit the RRC reconfiguration message to the child IAB-node or UE;

a third transmitting unit 2406 configured to transmit an RRC reconfiguration complete message to the target donor device; and a fourth transmitting unit 2407 configured to transfer to the target donor device an RRC reconfiguration complete message transmitted by the child IAB-node or UE.

In some embodiments, that the processing unit 2303/2403 establishes the new F1 connection with the target donor device includes:

transmitting an F1 establishment request message to the target donor to request to establish the new F1 connection with the target donor device; and receiving an F1 establishment response message transmitted by the target donor device, thereby establishing the new F1 connection with the target donor device.

In some embodiments, after the new F1 connection is established, the processing unit 2303/2403 maintains the old F1 connection with the source donor device, and releases the old F1 connection with the source donor device if one of the following conditions is satisfied:

after transmitting the RRC reconfiguration message to the child IAB-node or UE served by the migrating IAB node;

after receiving the RRC reconfiguration complete message transmitted by the child IAB-node or UE served by the migrating IAB node; and after a predetermined time after the new F1 connection with the target donor device is established.

In some embodiments, after the new F1 connection is established, the processing unit 2303/2403 transmits an F1 release request message to the source donor device to release the old F1 connection with the source donor device.

In some embodiments, after the new F1 connection is established, the processing unit 2303/2403 transmits the RRC reconfiguration message for the child IAB-node or UE to the child IAB-node or UE, or, after the new F1 connection is established, the processing unit 2303/2403 transfers the RRC reconfiguration complete message transmitted by the child IAB-node or UE to the target donor device.

In some embodiments, as shown in FIG. 23 and FIG. 24, the apparatus 2300/2400 further includes:

a third receiving unit 2308/2408 configured to receive the backhaul RLC channel mapping and a BAP routing configuration configured by the target donor device after the third transmitting unit 2306/2406 transmits the RRC reconfiguration complete message to the target donor device.

In some embodiments, the RRC reconfiguration message for the migrating IAB-node includes one of the following:

a default uplink backhaul RLC channel identifier used in migrating to the target donor device;

a default BAP routing identifier used in migrating to the target donor device;

a BAP address used in migrating to the target donor device;

a transport layer address used in migrating to the target donor device; and a security key configuration used in migrating to the target donor device.

In some embodiments, the RRC reconfiguration message further includes backhaul RLC channel mapping and a BAP routing configuration used in migrating to the target donor device.

In some embodiments, after the third transmitting unit 2306/2406 transmits the RRC reconfiguration complete message to the target donor device, the processing unit 2303/2403 may apply the backhaul RLC channel mapping and BAP routing configuration.

It should be noted that the components or modules related to this disclosure are only described above. However, this disclosure is not limited thereto, and the group migration apparatus 2300/2400 of the embodiment of this disclosure may further include other components or modules, and reference may be made to related techniques for particulars of these components or modules.

Furthermore, for the sake of simplicity, connection relationships between the components or modules or signal profiles thereof are only illustrated in FIGS. 23 and 24. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

According to the method of the embodiment of this disclosure, as described above, an interruption time of service communication during the migration of the IAB node may be reduced.

Embodiment of a Sixth Aspect

The embodiment of this disclosure provides a group migration apparatus.

Figure 25:
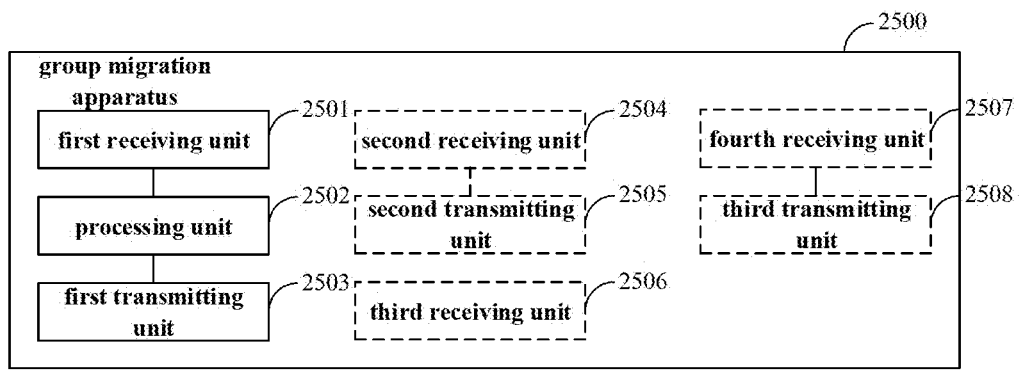
FIG. 25 is a schematic diagram of the group migration apparatus of an embodiment of a sixth aspect of this disclosure.

FIG. 25 is a schematic diagram of the group migration apparatus of the embodiment of this disclosure. The apparatus may be, for example, a child IAB-node served by a migrating IAB-node in an IAB network, or one or some components or assemblies configured in the child IAB-node. As principles of the apparatus for solving problems are similar to that of the method in FIG. 15 of the third embodiment, reference may be made to the method in FIG. 15, identical contents being not going to be repeated herein any further. As shown in FIG. 25, the group migration apparatus 2500 of the embodiment of this disclosure includes:

- a first receiving unit 2501 configured to receive an RRC reconfiguration message transmitted by a source donor device or a target donor device;
- a processing unit 2502 configured to establish new F1 connection with the target donor device; and
- a first transmitting unit 2503 configured to transmit an RRC reconfiguration complete message to the target donor device.

In some embodiments, that the processing unit 2502 establishes new F1 connection with the target donor device includes: transmitting an F1 establishment request message to the target donor to request to establish the F1 connection with the target donor device; and receiving an F1 establishment response message transmitted by the target donor device, thereby establishing the F1 connection with the target donor device.

In some embodiments, after the new F1 connection is established, the processing unit 2502 maintains the old F1 connection with the source donor device, and releases the old F1 connection with the source donor device if one of the following conditions is satisfied:

after transmitting the RRC reconfiguration message to a grandchild IAB-node or UE served by the child IAB-node;
after receiving an RRC reconfiguration complete message transmitted by the grandchild IAB-node or UE served by the child IAB-node;
after a predetermined time after the new F1 connection with the target donor device is established.

In some embodiments, after the new F1 connection is established, the processing unit 2502 transmits the F1 release request message to the source donor device to release the old F1 connection with the source donor device.

In some embodiments, as shown in FIG. 25, the apparatus 2500 further includes:

- a second receiving unit 2504 configured to receive an F1AP message transmitted by the target donor device via the new F1 connection, the F1AP message containing the RRC reconfiguration message for the grandchild IAB-node or UE served by the child IAB-node; and
- a second transmitting unit 2505 configured to transmit the RRC reconfiguration message to the grandchild IAB-node or UE.

In some embodiments, as shown in FIG. 25, the apparatus 2500 further includes:

- a third receiving unit 2506 configured to, after the first transmitting unit 2503 transmits the RRC reconfiguration complete message to the target donor device, receive the BAP routing configuration configured by the target donor.

In some embodiments, as shown in FIG. 25, the apparatus 2500 further includes:

- a fourth receiving unit 2507 configured to receive the F1AP message transmitted by the source donor device via the old F1 connection with the child IAB-node, the F1AP message containing the RRC reconfiguration message for the grandchild IAB-node or UE served by the child IAB-node; and
- a third transmitting unit 2508 configured to transmit the RRC reconfiguration message to the grandchild IAB-node or UE, and transfer the RRC reconfiguration complete message transmitted by the grandchild IAB-node or UE to the target donor device.

In some embodiments, after the new F1 connection is established, the third transmitting unit 2508 transmits the RRC reconfiguration message for the grandchild IAB-node or UE to the served grandchild IAB-node or UE, or, after the new F1 connection is established, the third transmitting unit 2508 transmits the RRC reconfiguration complete message for the served grandchild IAB-node or UE to the target donor device.

In some embodiments, the RRC reconfiguration message for the child IAB-node includes one of the following:

- a default BAP routing identifier used in migrating to the target donor device;
- a BAP address used in migrating to the target donor device;
- a transport layer address used in migrating to the target donor device; and
- a security key configuration used in migrating to the target donor device.

In some embodiments, the RRC reconfiguration message further includes: a BAP routing configuration used in migrating to the target donor device.

In some embodiments, after determining that the migrating IAB node has completed migrating to the target donor device and after transmitting the RRC reconfiguration complete message to the target donor device, the processing unit 2502 applies the BAP routing configuration.

Figure 26:
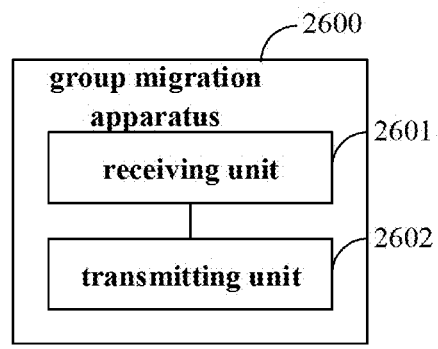
FIG. 26 is another schematic diagram of the group migration apparatus of the embodiment of the sixth aspect of this disclosure.

FIG. 26 is a schematic diagram of the group migration apparatus of the embodiment of this disclosure. The apparatus may be, for example, a UE served by a migrating IAB-node in an IAB network, or one or some components or assemblies configured in the UE. As principles of the apparatus for solving problems are similar to that of the method in FIG. 16 of the third embodiment, reference may be made to the method in FIG. 16, identical contents being not going to be repeated herein any further. As shown in FIG. 26, the group migration apparatus 2600 of the embodiment of this disclosure includes:

- a receiving unit 2601 configured to receive an RRC reconfiguration message transmitted by a source donor device or a target donor device; and
- a transmitting unit 2602 configured to transmit an RRC reconfiguration complete message to the target donor device.

In the embodiment of this disclosure, the RRC reconfiguration message includes: a security key configuration used in migrating to the target donor device.

According to the method of the embodiment of this disclosure, as described above, an interruption time of service communication during the migration of the IAB node may be reduced.

Embodiment of a Seventh Aspect

Figure 27:
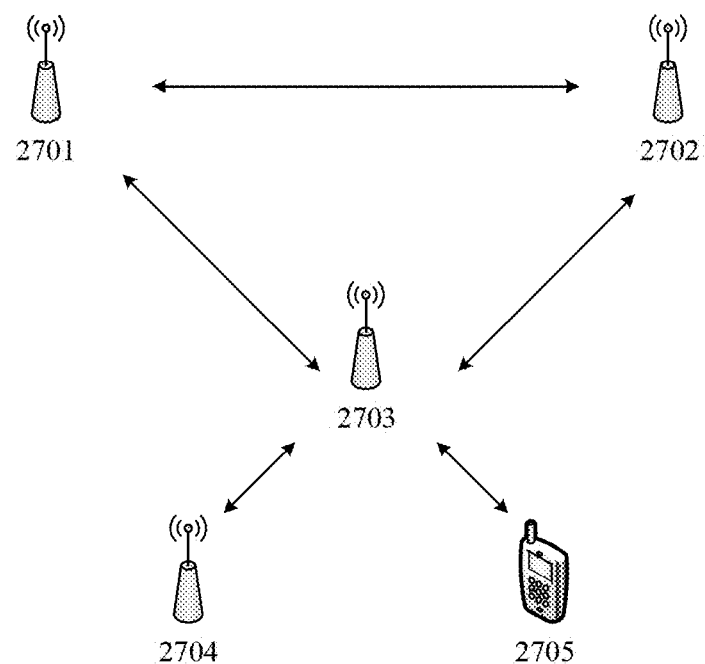
FIG. 27 is a schematic diagram of the communication system of an embodiment of a seventh aspect of this disclosure.

The embodiment of this disclosure provides a communication system. FIG. 27 is a schematic diagram of the communication system 2700. As shown in FIG. 27, the communication system 2700 includes donor devices 2701 and 2702, IAB nodes 2703 and 2704, and a terminal equipment 2705, where the IAB node 2703 is a migrating IAB node, the donor device 2701 is taken as a source donor device of the IAB node 2703, and donor device 2702 is taken as a target donor device of the IAB node 2703, and the IAB node 2704 and terminal equipment 2705 are served by the IAB node 2703, that is, the IAB node 2704 is a child IAB-node of the IAB node 2703.

For the sake of simplicity, two donor devices, two IAB nodes and one terminal equipment are only taken as examples in FIG. 27; however, the embodiment of this disclosure is not limited thereto. Reference may be made to relevant technologies for network architectures of the donor devices, IAB nodes and terminal equipment, which shall not be described herein any further.

In some embodiments, the donor device 2701 is configured to execute the methods shown in FIGS. 8 and 10, and may include the apparatuses of FIGS. 19 and 21. In some embodiments, the donor device 2702 is configured to execute the methods shown in FIGS. 9 and 11, and may include the apparatuses of FIGS. 20 and 22. In some embodiments, the IAB node 2703 is configured to execute the methods shown in FIGS. 13 and 14, and may include the apparatuses in FIGS. 23 and 24. In some embodiments, the IAB node 2704 is configured to execute the method shown in FIG. 15, and may include the apparatus of FIG. 25. In some embodiments, the terminal equipment 2705 is configured to execute the method shown in FIG. 16, and may include the apparatus of FIG. 26. Reference may be made to the embodiments of the first to six aspects for relevant contents of the donor devices 2701 and 2702, IAB nodes 2703 and 2704 and terminal equipment 2705, which shall not be described herein any further.

The embodiment of this disclosure further provides an IAB node.

Figure 28:
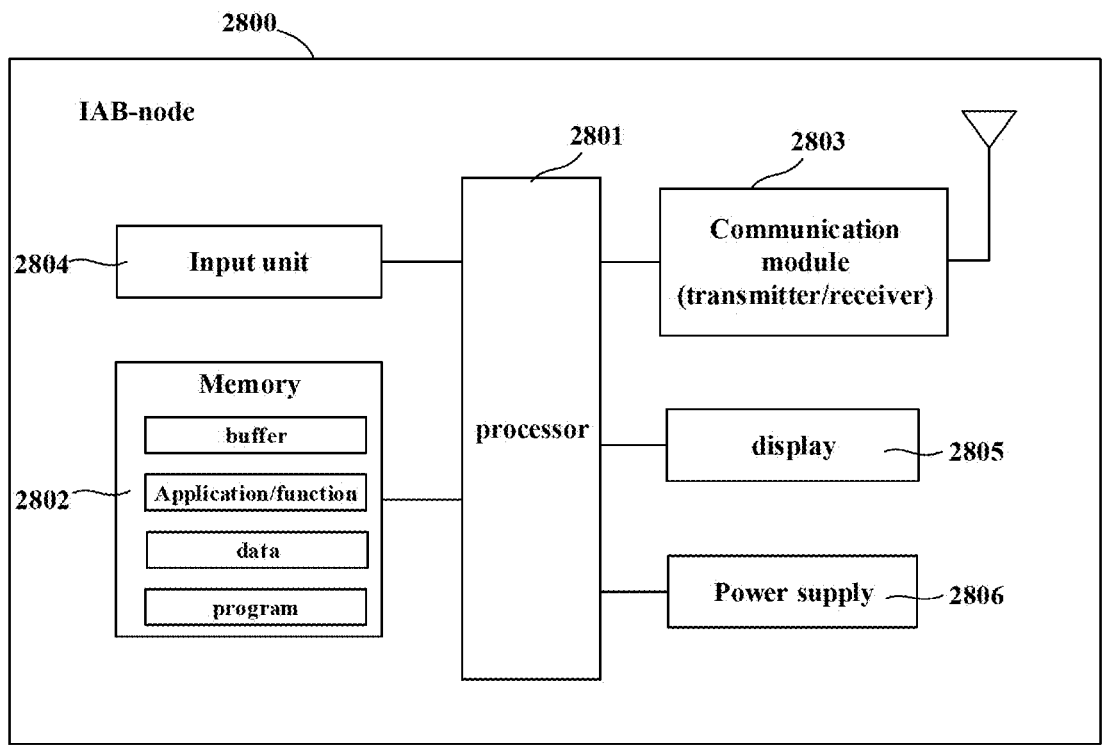
FIG. 28 is a schematic diagram of the IAB node of the embodiment of the seventh aspect of this disclosure.

FIG. 28 is a schematic diagram of the IAB node of the embodiment of this disclosure. As shown in FIG. 28, the IAB node 2800 may include a processor 2801 and a memory 2802, the memory 2802 storing data and a program and being coupled to the processor 2801. It should be noted that this figure is illustrative only, and other types of structures may also be used to supplement or replace this structure, so as to realize telecommunications functions or other functions.

For example, the processor 2801 may be configured to execute a program to execute the method described in the embodiment of FIG. 13 or FIG. 14 of the second aspect or the embodiment of FIG. 15 of the third aspect.

As shown in FIG. 28, the IAB node 2800 may further include a communication module 2803, an input unit 2804, a display 2805, and a power supply 2806. Functions of these components are similar to those in the related art, and shall not be described herein any further. It should be noted that the IAB node 2800 does not necessarily include all the components shown in FIG. 28, and the above components are not necessary; and furthermore, the IAB node 2800 may include components not shown in FIG. 28, and the related art may be referred to.

The embodiment of this disclosure further provides a donor device.

Figure 29:
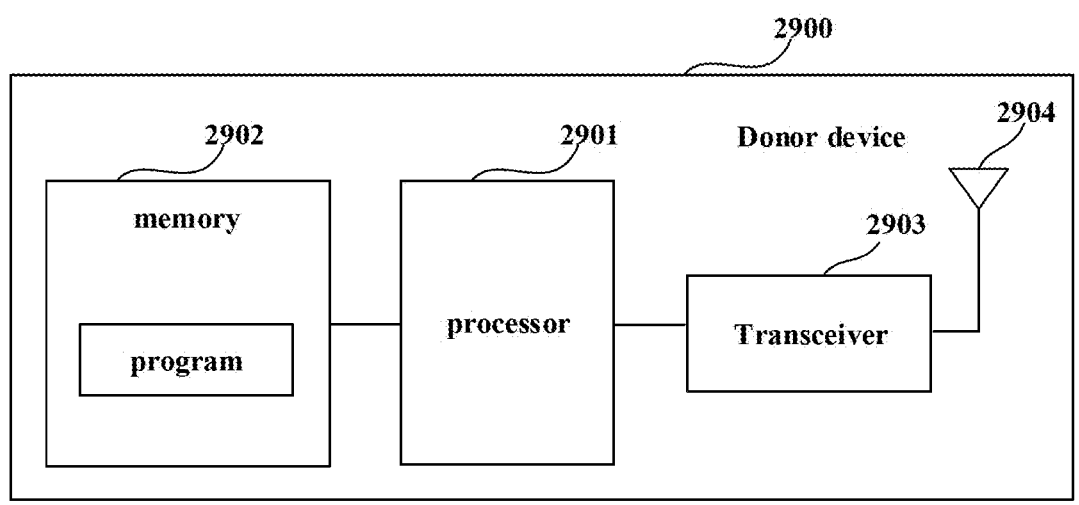
FIG. 29 is a schematic diagram of the donor device of the embodiment of the seventh aspect of this disclosure.

FIG. 29 is a schematic diagram of the donor device of the embodiment of this disclosure. As shown in FIG. 29, the donor device 2900 may include a processor (such as a central processing unit (CPU)) 2901 and a memory 2902, the memory 2902 being coupled to processor 2901. The memory 2902 may store various data, and furthermore, it may store a program for information processing, and execute the program under control of the central processing unit 2901.

For example, the processor 2901 may be configured to execute a program to execute the method described in the embodiment of FIG. 8 or 9 or FIG. 10 or FIG. 11 of the first aspect.

Furthermore, as shown in FIG. 29, the donor device 2900 may further include a transceiver 2903, and an antenna 2904, etc.; functions of the above components are similar to those in the related art, which shall not be described herein any further. It should be noted that the donor device 2900 does not necessarily include all the components shown in FIG. 29; and furthermore, the donor device 2900 may include components not shown in FIG. 29, and the related art may be referred to.

The embodiment of this disclosure further provides a terminal equipment.

Figure 30:
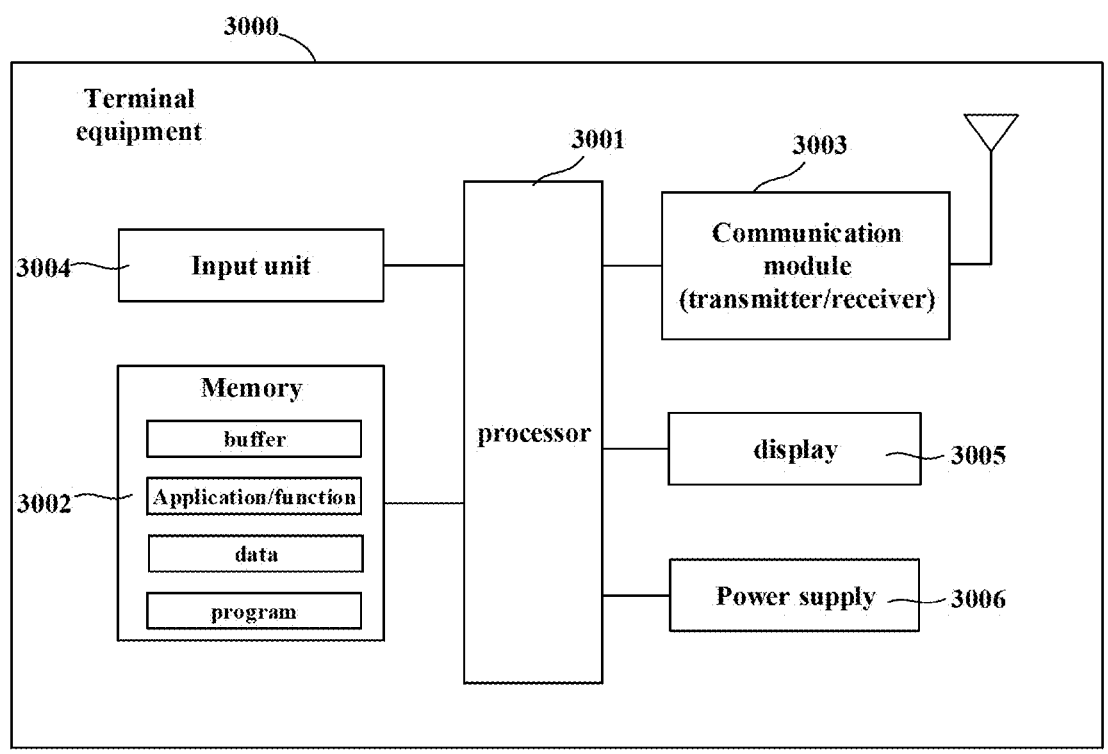
FIG. 30 is a schematic diagram of the terminal equipment of the embodiment of the seventh aspect of this disclosure.

FIG. 30 is a schematic diagram of the terminal equipment of the embodiment of this disclosure. As shown in FIG. 30, the terminal equipment 2800 may include a processor 2801 and a memory 3002, the memory 3002 storing data and a program and being coupled to the processor 3001. It should be noted that this figure is illustrative only, and other types of structures may also be used to supplement or replace this structure, so as to realize telecommunications functions or other functions.

For example, the processor 3001 may be configured to execute a program to execute the method described in the embodiment of FIG. 16 of the third aspect.

As shown in FIG. 30, the terminal equipment 3000 may further include a communication module 3003, an input unit 3004, a display 3005, and a power supply 3006. Functions of these components are similar to those in the related art, and shall not be described herein any further. It should be noted that the terminal equipment 3000 does not necessarily include all the components shown in FIG. 30, and the above components are not necessary; and furthermore, the terminal equipment 3000 may include components not shown in FIG. 30, and the related art may be referred to.

An embodiment of this disclosure provides a computer readable program, which, when executed in an IAB node, will cause a computer to carry out the method as described in the embodiment of the second aspect or the embodiment of FIG. 15 of the third aspect in the IAB node.

An embodiment of this disclosure provides a storage medium storing a computer readable program, which will cause a computer to carry out the method as described in the embodiment of the second aspect or the embodiment of FIG. 15 of the third aspect in an IAB node.

An embodiment of this disclosure provides a computer readable program, which, when executed in a donor device, will cause a computer to carry out the method as described in the embodiment of the first aspect in the donor device.

An embodiment of this disclosure provides a storage medium storing a computer readable program, which will cause a computer to carry out the method as described in the embodiment of the first aspect in a donor device.

An embodiment of this disclosure provides a computer readable program, which, when executed in a terminal equipment, will cause a computer to carry out the method as described in the embodiment of FIG. 16 of the third aspect in the terminal equipment.

An embodiment of this disclosure provides a storage medium storing a computer readable program, which will cause a computer to carry out the method as described in the embodiment of FIG. 16 of the third aspect in a terminal equipment.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to the above implementations disclosed in the embodiments, following supplements are further disclosed.

1. A group migration method, applicable to a source donor device, wherein the method includes:
receiving a measurement report transmitted by a migrating IAB node;
transmitting a first migration request message to a target donor device, the first migration request message including context information on the migrating IAB node and its served child IAB-node or UE;
receiving a first response message transmitted by the target donor device, the first response message including an RRC reconfiguration message for the migrating IAB node and its served child IAB-node or UE; and
transmitting the RRC reconfiguration message to the migrating IAB node and its served child IAB-node or UE.

2. A group migration method, applicable to a source donor device, wherein the method includes:
receiving a measurement report transmitted by a migrating IAB node;
transmitting a first migration request message to a target donor device, the first migration request message including context information on the migrating IAB node and its served child IAB-node or UE;
receiving a first response message transmitted by the target donor device, the first response message including an RRC reconfiguration message for the migrating IAB node; and
transmitting the RRC reconfiguration message to the migrating IAB node.

3. A group migration method, applicable to a target donor device, wherein the method includes:
receiving a first migration request message transmitted by a source donor device, the first migration request message including context information on a migrating IAB node and its served child IAB-node or UE;
transmitting a first response message to the source donor device, the first response message including an RRC reconfiguration message for the migrating IAB node and its served child IAB-node or UE;
establishing new F1 connection with the migrating IAB node; and
receiving an RRC reconfiguration complete message transmitted by the migrating IAB node and its served child IAB-node or UE.

4. A group migration method, applicable to a target donor device, wherein the method includes:
receiving a first migration request message transmitted by a source donor device, the first migration request message including context information on a migrating IAB node and its served child IAB-node or UE;
transmitting a first response message to the source donor device, the first response message including an RRC reconfiguration message for the migrating IAB node;
establishing new F1 connection with the migrating IAB node;
transmitting an RRC reconfiguration message to the child IAB-node or UE served by the migrating IAB node via the new F1 connection; and
receiving an RRC reconfiguration complete message transmitted by the migrating IAB node and its served child IAB-node or UE.

5. The method according to any one of supplements 1-4, wherein,
the context information on the migrating IAB node includes: an IAB-DU context and an IAB-MT context of the migrating IAB node;
and the context information on the child IAB-node includes: an IAB-DU context and an IAB-MT context of the child IAB-node.

6. The method according to supplement 5, wherein the IAB-DU context of the migrating IAB node includes: serving cell information of the LAB-DU of the migrating IAB node under the source donor device.

7. The method according to supplement 6, wherein the serving cell information includes at least one of the following:
- a new radio cell global identifier (NR CGI);
- a new radio physical cell identifier (NR PCI);
- a public land mobile network (PLMN) served by the IAB-DU; and
- an uplink and downlink transmission frequency point and bandwidth.

8. The method according to supplement 5, wherein the IAB-MT context of the migrating IAB node includes BAP configuration information, wherein the BAP configuration information includes a BAP address, a transport layer (IP) address, a default uplink backhaul RLC channel identifier and/or a default uplink BAP routing identifier allocated by the source donor device for the IAB node, wherein the default uplink BAP routing identifier refers to a default destination BAP address and a default path identifier.

9. The method according to any one of supplements 1-4, wherein the first migration request message further includes backhaul information.

10. The method according to supplement 9, wherein the backhaul information includes at least one of the following:
- a correspondence between a previous hop BAP address with ingress backhaul RLC channel identifier and a next hop BAP address with egress backhaul RLC channel identifier; and
- a correspondence between a BAP routing identifier configured by the source donor device for a migrating IAB node or a child IAB-node and a next hop BAP address.

11. The method according to supplement 9, wherein the backhaul information includes at least one of the following:
- a BAP routing identifier used by a DRB of a UE served by the migrating IAB node or the child IAB-node, a next hop BAP address and a backhaul RLC channel identifier, and
- a BAP routing identifier used by F1-control plane data or non-F1 data, a next hop BAP address and a backhaul RLC channel identifier.

12. The method according to supplement 10 or 11, wherein the BAP routing identifier includes a destination BAP address and a path identifier.

13. The method according to any one of supplements 1-4, wherein the first migration request message further includes topology information, the topology information including a topology relationship between the migrating IAB node and its served child IAB-node or UE, or including a topology relationship between the child IAB-node and a grandchild IAB-node or UE served by the child IAB-node.

14. The method according to any one of supplements 1-4, wherein the first migration request message further includes address request information, the address request information being used to request the target donor device to allocate a new transport layer (IP) address or a BAP address for the migrating IAB node or a child IAB-node.

15. The method according to supplement 3 or 4, wherein the establishing new F1 connection with the migrating IAB node includes:
- receiving an F1 establishment request message transmitted by the migrating IAB node; and
- transmitting an F1 establishment response message to the migrating IAB node.

16. The method according to supplement 3 or 4, wherein the method further includes: establishing new F1 connection with the child IAB-node.

17. The method according to supplement 3 or 4, wherein the method further includes:
configuring backhaul RLC channel mapping and a BAP routing configuration for the migrating IAB node, after the target donor device receives the RRC reconfiguration complete message transmitted by the migrating IAB node.

18. The method according to supplement 3, wherein the method further includes:
- transmitting a first indication message to the source donor device, after the target donor device receives the RRC reconfiguration complete message transmitted by the migrating IAB node or after the target donor device establishes new F1 connection with the migrating IAB node,
- wherein the first indication message is used to indicate the source donor device to transmit the RRC reconfiguration message to the child IAB-node or UE.

19. The method according to any one of supplements 1-4, wherein the context information on the migrating IAB node and the context information on the child IAB-node or UE are included in same Xn messages or different Xn messages.

20. The method according to supplement 19, wherein the method further includes:
- transmitting a second indication message to the source donor device, after the target donor device receives the RRC reconfiguration complete message transmitted by the migrating IAB node, or after the target donor device establishes new F1 connection with the migrating IAB node,
- wherein the second indication message is used to indicate the source donor device to transmit an Xn message containing the context of the child IAB-node or UE to the target donor device.

21. The method according to supplement 1 or 3, wherein the RRC reconfiguration message for the migrating IAB node and the RRC reconfiguration message for the child IAB-node or UE are contained in same Xn messages or different Xn messages.

22. The method according to supplement 21, wherein the method further includes:
- transmitting the Xn message containing the RRC reconfiguration message for the child IAB-node or UE to the source donor device, after the target donor device receives the RRC reconfiguration complete message transmitted by the migrating IAB node, or after the target donor device establishes new F1 connection with the migrating IAB node.

23. The method according to supplement 3 or 4, wherein the method further includes:
- configuring BAP routing configuration for the child IAB-node, after the target donor device receives the RRC reconfiguration complete message transmitted by the migrating IAB node and the RRC reconfiguration complete message transmitted by the child IAB-node.

24. The method according to any one of supplements 1-4, wherein the RRC reconfiguration message for the migrating IAB node includes at least one of the following:
- a default uplink backhaul RLC channel identifier used in migrating to the target donor device;
- a default BAP routing identifier used in migrating to the target donor device;
- a BAP address used in migrating to the target donor device;
- a transport layer address used in migrating to the target donor device; and
- a security key configuration used in migrating to the target donor device.

25. The method according to supplement 24, wherein the RRC reconfiguration message for the migrating IAB node further includes: backhaul RLC channel mapping and a BAP routing configuration used for migrating to the target donor device.

26. The method according to any one of supplements 1, 3 or 4, wherein the RRC reconfiguration message for the child IAB-node includes at least one of the following:
a default BAP routing identifier used in migrating to the target donor device;
a BAP address used in migrating to the target donor device;
a transport layer address used in migrating to the target donor device; and a security key configuration used in migrating to the target donor device.

27. The method according to supplement 26, wherein the RRC reconfiguration message for the child IAB-node further includes: a BAP routing configuration used in migrating to the target donor device.

28. The method according to any one of supplements 1, 3 or 4, wherein the RRC reconfiguration message for the UE includes:
a security key configuration used in migrating to the target donor device.

29. A group migration method, applicable to a migrating IAB-node, wherein the method includes:
transmitting a measurement report to a source donor device;
receiving an RRC reconfiguration message transmitted by the source donor device;
establishing new F1 connection with a target donor device;
receiving an RRC reconfiguration message for a child IAB-node or UE served by the migrating IAB node transmitted by the source donor device via old F1 connection;
transmitting the RRC reconfiguration message to the child IAB-node or UE, and transmitting an RRC reconfiguration complete message to the target donor device; and
transferring to the target donor device an RRC reconfiguration complete message transmitted by the child IAB-node or UE.

30. A group migration method, applicable to a migrating IAB-node, wherein the method includes:
transmitting a measurement report to a source donor device;
receiving an RRC reconfiguration message transmitted by the source donor device;
establishing new F1 connection with a target donor device;
receiving an RRC reconfiguration message for a child IAB-node or UE served by the migrating IAB node transmitted by the target donor device via the new F1 connection;
transmitting the RRC reconfiguration message to the child IAB-node or UE;
transmitting an RRC reconfiguration complete message to the target donor device; and
transferring to the target donor device an RRC reconfiguration complete message transmitted by the child IAB-node or UE.

31. The method according to supplement 29 or 30, wherein the establishing new F1 connection with the target donor device includes:
transmitting an F1 establishment request message to the target donor device to request to establish the new F1 connection with the target donor device; and
receiving an F1 establishment response message transmitted by the target donor device, so as to establish new F1 connection with the target donor device.

32. The method according to supplement 29 or 30, wherein the method further includes:
maintaining the old F1 connection with the source donor device after the new F1 connection is established, and
releasing the old F1 connection with the source donor device if one of the following conditions is satisfied:
after transmitting the RRC reconfiguration message to the child IAB-node or UE served by the migrating IAB node;
after receiving the RRC reconfiguration complete message transmitted by the child IAB-node or UE served by the migrating IAB node; and
after a predetermined time after the new F1 connection with the target donor device is established.

33. The method according to supplement 29 or 30, wherein the method further includes:
transmitting an F1 release request message to the source donor device after the new F1 connection is established, so as to release the old F1 connection with the source donor device.

34. The method according to supplement 29, wherein the method further includes:
transmitting the RRC reconfiguration message for the child IAB-node or UE to the child IAB-node or UE after the new F1 connection is established, or,
transferring the RRC reconfiguration complete message transmitted by the child IAB-node or UE to the target donor device after the new F1 connection is established.

35. The method according to supplement 29 or 30, wherein the method further includes:
receiving the backhaul RLC channel mapping and BAP routing configuration configured by the target donor device after transmitting the RRC reconfiguration complete message to the target donor device.

36. The method according to supplement 29 or 30, wherein the RRC reconfiguration message for the migrating IAB-node includes one of the following:
a default uplink backhaul RLC channel identifier used in migrating to the target donor device;
a default BAP routing identifier used in migrating to the target donor device;
a BAP address used in migrating to the target donor device;
a transport layer address used in migrating to the target donor device; and
a security key configuration used in migrating to the target donor device.

37. The method according to supplement 36, wherein the RRC reconfiguration message further includes the backhaul RLC channel mapping and BAP routing configuration used in migrating to the target donor device.

38. The method according to supplement 37, wherein the method further includes:
applying the backhaul RLC channel mapping and BAP routing configuration after transmitting the RRC reconfiguration complete message to the target donor device.

39. A group migration method, applicable to a child IAB-node served by a migrating IAB-node, wherein the method includes:
receiving an RRC reconfiguration message transmitted by a source donor device or a target donor device;
establishing new F1 connection with the target donor device; and transmitting an RRC reconfiguration complete message to the target donor device.

40. The method according to supplement 39, wherein the establishing new F1 connection with the target donor device includes:
   transmitting an F1 establishment request message to the target donor to request to establish the F1 connection with the target donor device; and
   receiving an F1 establishment response message transmitted by the target donor device, thereby establishing the F1 connection with the target donor device.

41. The method according to supplement 39, wherein the method further includes:
   maintaining the old F1 connection with the source donor device after the new F1 connection is established, and
   releasing the old F1 connection with the source donor device if one of the following conditions is satisfied:
   after transmitting the RRC reconfiguration message to a grandchild IAB-node or UE served by the child IAB-node; or,
   after receiving an RRC reconfiguration complete message transmitted by the grandchild IAB-node or UE served by the child IAB-node; or,
   after a predetermined time after the new F1 connection with the target donor device is established.

42. The method according to supplement 39, wherein the method further includes:
   transmitting the F1 release request message to the source donor device after the new F1 connection is established, so as to release the old F1 connection with the source donor device.

43. The method according to supplement 39, wherein the method further includes:
   receiving an F1AP message transmitted by the target donor device via the new F1 connection, the F1AP message containing the RRC reconfiguration message for the grandchild IAB-node or UE served by the child IAB-node; and
   transmitting the RRC reconfiguration message to the grandchild IAB-node or UE.

44. The method according to supplement 39, wherein the method further includes:
   receiving a BAP routing configuration configured by the target donor after transmitting the RRC reconfiguration complete message to the target donor device.

45. The method according to supplement 39, wherein the method further includes:
   receiving the F1AP message transmitted by the source donor device via the old F1 connection with the child IAB-node, wherein the F1AP message contains the RRC reconfiguration message for the grandchild IAB-node or UE served by the child IAB-node;
   transmitting the RRC reconfiguration message to the grandchild IAB-node or UE; and
   transferring to the target donor device the RRC reconfiguration complete message transmitted by the grandchild IAB-node or UE.

46. The method according to supplement 45, wherein the method further includes:
   transmitting the RRC reconfiguration message for the grandchild IAB-node or UE to the served grandchild IAB-node or UE after the new F1 connection is established, or, transferring the RRC reconfiguration complete message transmitted by the grandchild IAB-node or UE to the target donor device after the new F1 connection is established.

47. The method according to supplement 39, wherein the RRC reconfiguration message for the child IAB-node includes one of the following:
   a default BAP routing identifier used in migrating to the target donor device;
   a BAP address used in migrating to the target donor device;
   a transport layer address used in migrating to the target donor device; and
   a security key configuration used in migrating to the target donor device.

48. The method according to supplement 47, wherein the RRC reconfiguration message further includes: a BAP routing configuration used in migrating to the target donor device.

49. The method according to supplement 48, wherein the method further includes: applying the BAP routing configuration after determining that the migrating IAB node has completed migrating to the target donor device and after transmitting the RRC reconfiguration complete message to the target donor device.

50. A group migration method, applicable to a terminal equipment served by a migrating IAB node, wherein the method includes:
   receiving an RRC reconfiguration message transmitted by a source donor device or a target donor device; and
   transmitting an RRC reconfiguration complete message to the target donor device.

51. The method according to supplement 50, wherein the RRC reconfiguration message includes: a security key configuration used in migrating to the target donor device.

52. A donor device, including a memory and a processor, the memory storing a computer program, wherein the processor is configured to execute the computer program to carry out the method as described in any one of supplements 1-28.

53. An IAB-node, including a memory and a processor, the memory storing a computer program, wherein the processor is configured to execute the computer program to carry out the method as described in any one of supplements 29-49.

54. A terminal equipment, including a memory and a processor, the memory storing a computer program, wherein the processor is configured to execute the computer program to carry out the method as described supplement 50 or 51.

55. A communication system, including a donor device, an IAB-node and terminal equipment, wherein the donor device is configured to configured to carry out the method as described in any one of supplements 1-28, the IAB-node is configured to carry out the method as described in any one of supplements 29-49, and the terminal equipment is configured to carry out the method as described supplement 50 or 51.

What is claimed is:

1. A group migration apparatus, configured in a source donor device, the apparatus comprising:
   a first transmitter configured to transmit a first request message to a target donor device, the first request message including context information on a migrating IAB node or a child IAB-node or UE (user equipment) served by the migrating IAB node;
   a receiver configured to receive a first response message transmitted by the target donor device, the first response message including reconfiguration information for the migrating IAB node or the child IAB-node or UE served by the migrating IAB node; and a second transmitter configured to transmit an RRC (radio resource control) reconfiguration message to the migrating IAB node and the child IAB-node or UE served by the migrating IAB node;

wherein the first request message further contains backhaul information, the backhaul information comprises at least one of the following:

a BAP (backhaul adaptation protocol) routing identifier used by a DRB (data radio bearer) of a UE served by the migrating IAB node or the child IAB-node, the BAP address and a backhaul RLC (radio link control) channel identifier of a next hop of node, and a BAP routing identifier used by F1-control plane data or non-F1 data, and a backhaul RLC channel identifier;

wherein the first request message further contains address request information, the address request information is used to request the target donor device to allocate a new transport layer (IP) address or a BAP address for the child IAB-node.

2. A group migration apparatus, configured in a target donor device, the apparatus comprising:

a first receiver configured to receive a first request message transmitted by a source donor device, the first request message including context information on a migrating IAB (integrated access and backhaul) node or a child IAB-node or UE (user equipment) served by the migrating IAB node;

a first transmitter configured to transmit a first response message to the source donor device, the first response message comprising reconfiguration information for the migrating IAB node or the child IAB-node or UE served by the migrating IAB node;

a first processor configured to establish new F1 connection with the migrating IAB node; and a second receiver configured to receive an RRC (radio resource control) reconfiguration complete message transmitted by the migrating IAB node or the child IAB-node or UE served by the migrating IAB node;

wherein the first request message further contains backhaul information, the backhaul information comprises at least one of the following:

a BAP routing identifier used by a DRB of a UE served by the migrating IAB node or the child IAB node, the BAP address and a backhaul RLC channel identifier of a next hop of node, and a BAP routing identifier used by a F1 control plane data or a non-F1 data, and a backhaul RLC channel identifier:

wherein the apparatus further comprises:

a fourth transmitter configured to transmit an Xn message including the reconfiguration information for the child IAB-node or UE to the source donor device after the target donor device receives the RRC reconfiguration complete message transmitted by the migrating IAB node and establishes new F1 connection with the migrating IAB node.

3. The apparatus according to claim 2, wherein the apparatus further comprises:

first configuring processor circuitry configured to configure backhaul RLC (radio link control) channel mapping and a BAP (backhaul adaptation protocol) routing configuration for the migrating IAB node after the target donor device receives the RRC (radio resource control) reconfiguration complete message transmitted by the migrating IAB node.

4. The apparatus according to claim 2, wherein the reconfiguration information for the migrating IAB node and the reconfiguration information for the child IAB node or UE are included in same Xn messages or different Xn messages.

5. The apparatus according to claim 4, wherein the apparatus further comprises:

a second transmitter configured to transmit a first indication message to the source donor device after the target donor device receives the RRC reconfiguration complete message transmitted by the migrating IAB node and establishes new F1 connection with the migrating IAB node, wherein the first indication message is used to indicate the source donor device to transmit an RRC reconfiguration message to the child IAB node or the UE.

6. The apparatus according to claim 4, wherein the apparatus further comprises:

a third transmitter configured to transmit a second indication message to the source donor device after the target donor device receives the RRC reconfiguration complete message transmitted by the migrating IAB node and establishes new F1 connection with the migrating IAB node, wherein the second indication message is used to indicate the source donor device to transmit an Xn message containing a context on the child IAB node or the UE to the target donor device.

7. The apparatus according to claim 2, wherein the apparatus further comprises:

second configuring processor circuitry configured to configure the child IAB-node with BAP routing configuration after the target donor device receives the RRC reconfiguration complete message transmitted by the migrating IAB node and the RRC reconfiguration complete message transmitted by the child IAB-node.

8. The apparatus according to claim 2, wherein the reconfiguration information for the migrating IAB node comprises at least one of the following:

a default uplink backhaul RLC channel identifier used in migrating to the target donor device;

a default BAP routing identifier used in migrating to the target donor device;

a BAP address used in migrating to the target donor device;

a transport layer address used in migrating to the target donor device; and a security key configuration used in migrating to the target donor device.

9. The apparatus according to claim 8, wherein the RRG reconfiguration information for the migrating IAB node further comprises: backhaul RLC channel mapping and a BAP routing configuration used in migrating to the target donor device.

10. The apparatus according to claim 2, wherein the reconfiguration information for the child IAB-node comprises at least one of the following:

a default BAP routing identifier used in migrating to the target donor device;

a BAP address used in migrating to the target donor device;

a transport layer address used in migrating to the target donor device; and a security key configuration used in migrating to the target donor device.

11. The apparatus according to claim 10, wherein the reconfiguration information for the child IAB-node further comprises: a BAP routing configuration used in migrating to the target donor device.

12. The apparatus according to claim 2, wherein, the reconfiguration information for the UE comprises a security key configuration used in migrating to the target donor device and does not comprise PCI (physical cell ID) or frequency configuration for PCell (primary cell) of the UE.

13. A group migration apparatus, configured in a migrating IAB (integrated access and backhaul) node, the apparatus comprising:
- a first receiver configured to receive an RRC (radio resource control) reconfiguration message transmitted by a source donor device;
- a processor configured to establish new F1 connection with a target donor device;
- a second receiver configured to receive an RRC reconfiguration message for a child IAB-node or UE (user equipment) served by the migrating IAB node transmitted by the source donor device;
- a transmitter configured to transmit the RRC reconfiguration message to the child IAB-node or UE, and transmit an RRC reconfiguration complete message to the target donor device;

wherein after the new F1 connection is established, the processor maintains old F1 connection with the source donor device and releases the old F1 connection with the source donor device when one of the following conditions is satisfied:
after the RRC reconfiguration message is transmitted to the child IAB-node or UE served by the migrating IAB node;
after a predetermined time after the new F1 connection with the target donor device is established.

14. The apparatus according to claim 13, wherein, a cell on a first IAB-DU (distributed unit) of the migrating IAB-node which has old F1 connection with the source donor device and a cell on a second IAB-DU of the migrating IAB-node which establishes the new F1 connection with the target donor device share a same PCI (physical cell ID) and frequency resource.

* * * * *